(12) United States Patent
Fang

(10) Patent No.: US 10,641,399 B2
(45) Date of Patent: May 5, 2020

(54) VALVE

(71) Applicant: SHANGHAI HONGYAN RETURNABLE TRANSIT PACKAGINGS CO., LTD, Shanghai (CN)

(72) Inventor: Zhengwei Fang, Shanghai (CN)

(73) Assignee: SHANGHAI HONGYAN RETURNABLE TRANSIT PACKAGINGS CO., LTD., Shanghai (CN)

(*) Notice: Subject to any disclaimer, the term of this patent is extended or adjusted under 35 U.S.C. 154(b) by 58 days.

(21) Appl. No.: 15/110,515

(22) PCT Filed: Jan. 7, 2015

(86) PCT No.: PCT/CN2015/070282
§ 371 (c)(1),
(2) Date: Jul. 8, 2016

(87) PCT Pub. No.: WO2015/103981
PCT Pub. Date: Jul. 16, 2015

(65) Prior Publication Data
US 2016/0334023 A1    Nov. 17, 2016

(30) Foreign Application Priority Data

Jan. 8, 2014  (CN) .......................... 2014 1 0009071

(51) Int. Cl.
*F16K 5/06* (2006.01)
*F16K 5/20* (2006.01)
*F16K 27/06* (2006.01)

(52) U.S. Cl.
CPC .......... *F16K 5/0647* (2013.01); *F16K 5/0605* (2013.01); *F16K 5/204* (2013.01); *F16K 27/067* (2013.01)

(58) Field of Classification Search
CPC .... F16K 5/0647; F16K 27/067; F16K 5/0605; F16K 5/204; F16K 1/24; F16K 5/201
(Continued)

(56) References Cited

U.S. PATENT DOCUMENTS

| 1,595,038 A | 8/1926 | Vencl et al. |
| 2,934,310 A | 4/1960 | Kinney et al. |

(Continued)

FOREIGN PATENT DOCUMENTS

| CN | 1298070 | 6/2001 |
| CN | 2929383 | 8/2007 |

(Continued)

OTHER PUBLICATIONS

International Search Report for international application No. PCT/CN2015/070282, dated Apr. 21, 2015 (6 pages, including English translation).

(Continued)

*Primary Examiner* — Marina A Tietjen
(74) *Attorney, Agent, or Firm* — Hamre, Schumann, Mueller & Larson, P.C.

(57) ABSTRACT

A valve (100, 200, 300). The valve (100, 200, 300) comprises a valve body (1); a valve rod (4, 302); a valve core (2, 2', 304); a valve base (3, 305); a transmission apparatus (5', 5", 307) used for transmitting movement of the valve rod (4, 302) to the valve core (2, 2', 304); and a limiting apparatus (1h, 1g) used for limiting the movement sequence of the valve core (2, 2', 304). The limiting apparatus (1h, 1g) is used for limiting the movement of the valve core (2, 2', 304) during opening of the valve (100, 200, 300). The valve (100, 200, 300) can be opened according to a movement sequence, has a compact structure, and is easy to operate.

12 Claims, 15 Drawing Sheets

(58) Field of Classification Search
USPC ................ 251/160, 162, 163, 188, 187, 192
See application file for complete search history.

(56) References Cited

U.S. PATENT DOCUMENTS

| | | | |
|---|---|---|---|
| 3,065,950 A | | 11/1962 | Goldberg |
| 3,552,434 A | * | 1/1971 | Haenky ..................... F16K 5/08 137/556 |
| 3,746,302 A | * | 7/1973 | Larsen .................... F16K 5/185 251/103 |
| 3,776,505 A | * | 12/1973 | Nakanishi ................. F16K 1/24 251/163 |
| 4,013,264 A | * | 3/1977 | Friedell ................... F16K 5/061 251/129.11 |
| 4,029,292 A | * | 6/1977 | Kramer ................... F16K 5/204 251/163 |
| 4,141,536 A | | 2/1979 | Graham |
| 4,442,996 A | * | 4/1984 | Erwin ..................... F16K 5/0242 251/163 |
| 4,509,718 A | * | 4/1985 | Bormioli ................ F16K 5/204 251/163 |
| 4,770,392 A | * | 9/1988 | Schmidt ................... F16K 1/24 251/158 |
| 4,921,212 A | | 5/1990 | deQuay |
| 5,333,833 A | * | 8/1994 | Reinicke ................ F16K 5/201 251/129.04 |
| 5,755,427 A | | 5/1998 | Koskinas |
| 7,775,502 B2 | * | 8/2010 | Ohta ..................... F16K 27/067 251/163 |
| 9,279,505 B2 | * | 3/2016 | Yuan ....................... F16K 5/204 |
| 2004/0021117 A1 | * | 2/2004 | Chapman ................. F16K 1/24 251/298 |
| 2009/0189107 A1 | * | 7/2009 | Nishiba ................... F16K 1/24 251/226 |
| 2013/0341545 A1 | * | 12/2013 | Qian ..................... F16K 5/0647 251/188 |

FOREIGN PATENT DOCUMENTS

| | | |
|---|---|---|
| CN | 201166141 | 12/2008 |
| CN | 102011887 | 4/2011 |
| CN | 201902691 | 7/2011 |
| CN | 102322536 | 1/2012 |
| CN | 202215771 | 5/2012 |
| CN | 103016776 | 4/2013 |
| CN | 202992245 | 6/2013 |
| CN | 103759032 | 4/2014 |
| CN | 203743480 | 7/2014 |
| JP | S51-002745 | 1/1976 |
| JP | 2013545055 | 12/2013 |
| WO | WO 2013034032 A1 * | 3/2013 ............ F16K 5/204 |

OTHER PUBLICATIONS

Patent Examination Report issued for Australian patent appl. No. 2015205747, dated Sep. 6, 2016 (7 pages).

* cited by examiner

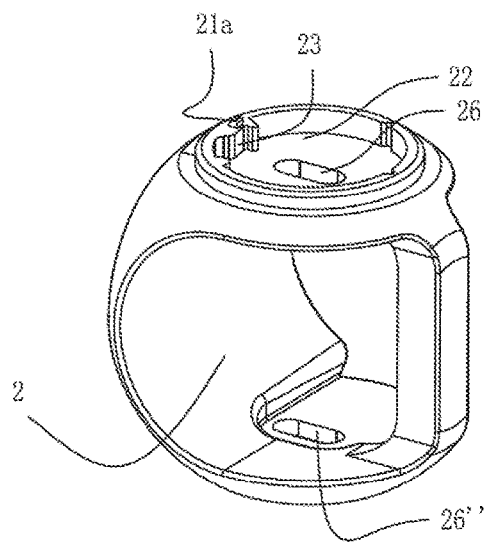
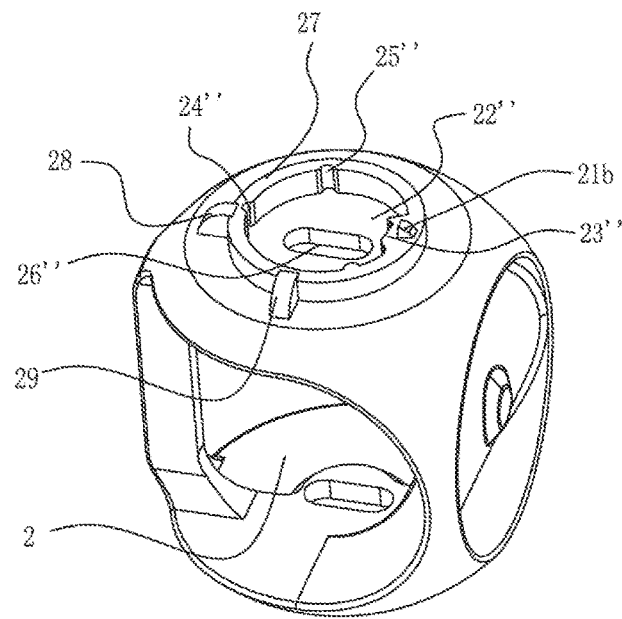
Fig. 7a
Fig. 7b
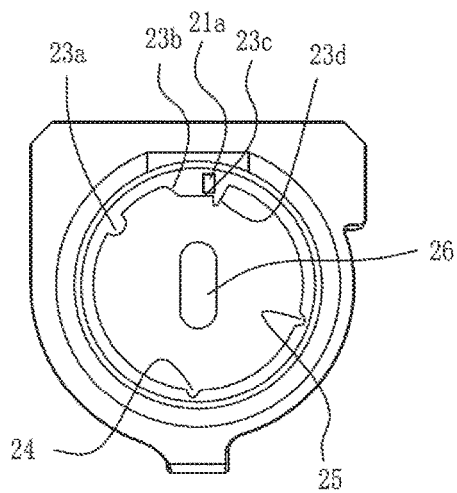
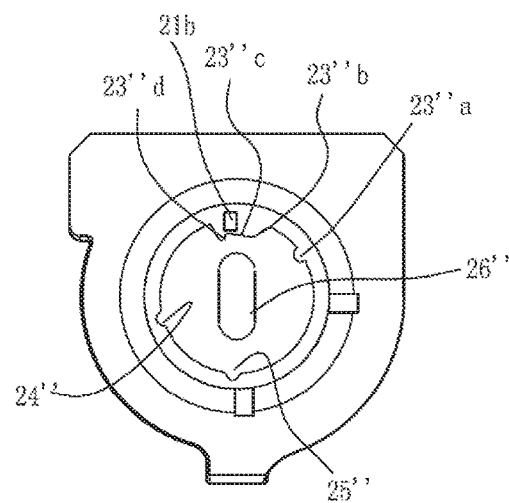
Fig. 7c
Fig. 7d

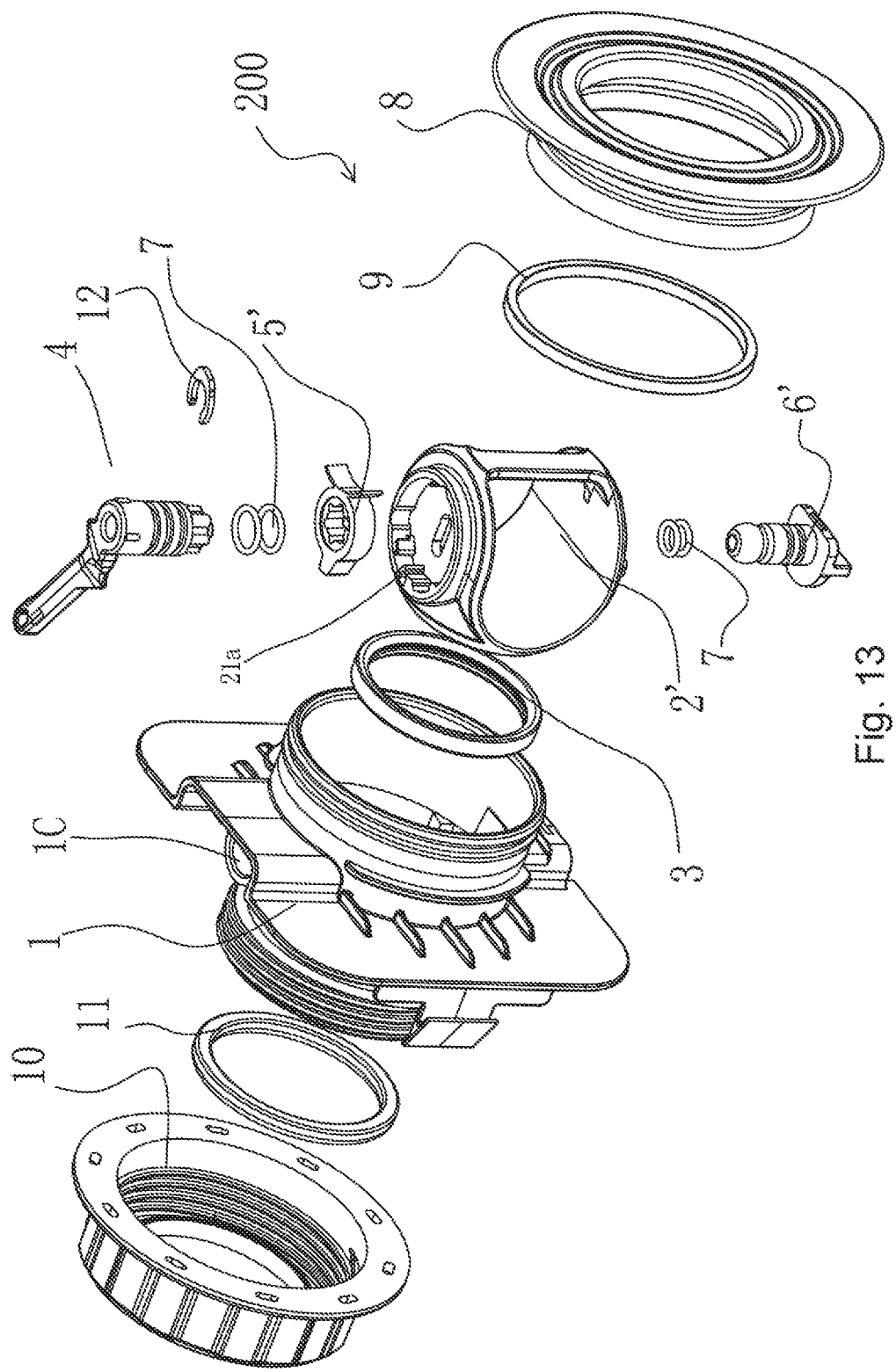

VALVE

TECHNICAL FIELD

The present invention relates to a valve, and in particular to a valve with low torque and low frictional force.

BACKGROUND

In order to optimize technical parameters of a ball valve, such as diameter, pressure, torque, life, there are a variety of composite valve opening and closing mechanisms in recent years.

Chinese patent application No. 200720082066 disclosed a ball valve with low torque including a valve body, a valve ball, a valve seat, a supporting seat, a valve stem, a driving device and supporting connection member of valve ball. Disadvantageous of this ball valve is that the driving device has complex structures, which occupy much of the outer space of the valve. The driving device involves many components and the assembling process is complicated. The rotating angle for opening and closing of the valve is 180 degree. The workspace formed by the stem and the driving device will impose high requirements on sealing process. The traditional sealing means and process are likely to cause leakage. In addition, the processing costs are high, not suitable for environmental conservation purposes.

Recently, a guiding groove lifting ball valve was developed in domestic and overseas, which has an s-shaped guiding groove on a valve stem for engaging with the guiding pin so that the ball counterclockwise rotates 90 degree for opening the valve after being driven departing from the valve seat by the valve stem when the valve stem is lifting. The ball is driven clockwise rotating 90 degree by the valve stem when the valve stem is descending and then the ball presses the valve for closing the valve. Disadvantageous of this valve is that the guiding groove occupies much space and the rotation angle is large as the valve stem has a long s-shape guiding groove so that the valve stem requires spiraling up or down when the valve is closed.

Chinese Patent Application No. 99124192.4 disclosed a rotary disc-shaped double-track "rotating" and "expanding and narrowing" opening and closing valve structure, which consists of a fixed disk, a rotating disk and a position limiting pin. When an external force drives the valve stem along with the rotating disk, the position limiting pin is actuated and clockwise rotates along the trajectory of the "circle" track on the fixed disk. When the position limiting pin rotates to a "straight line" track connecting to the "circle" track, the rotating disk continues to clockwise rotating. The position limiting pin is expanded toward the periphery of the fixed disk along the "straight line" of the fixed disk under the force of the "expanding and narrowing" track on the rotating disk, when the position limiting pin together with the valve sealing structure moves towards a valve seat to close the valve. The position limiting pin together with the valve sealing structure firstly narrows toward the center of the fixed disk along the "straight line" track of the fixed disk and secondly counterclockwise rotates along the "circle" track of the fixed disk so as to open the valve under the force of the "expanding and narrowing" track on the rotating disk, when the valve stem together with the rotating disk counterclockwise rotates. The disadvantages of this patent is that it employs "circle connecting straight line" track which requires high precision, complex processing technology and the valve cartridge is a assembly of ball so that it is difficult to obtain a balanced preload, resulting in damage of valve cartridge and shorten life of the valve.

Chinese patent 200620105067 disclose a track-type plug valve including a valve body, a valve cover, an operating member, a valve stem, a valve seat, a valve plug which forms a conical sealing pair of element with the valve seat, and track structure, which consists of a track ring with two guiding grooves mounted on the neck of the valve plug and dual pin plate with two guiding pins inserting in the two guiding grooves. The track structure further comprises a locknut for adjusting a position of the track ring and an adjusting ring. Disadvantage of this patent is that a transmission device has a complex structure, occupies much of space, and involves a lot of components, and the assembly process is complex. Furthermore, as it has the valve plug which with a conical sealing pair of element, the locknut for adjusting a position of the track ring and the adjusting ring, it requires multiple adjustment, resulting in complicated operation.

SUMMARY

The objective of the present invention is to provide a valve which can be opened in a particular movement sequence and have compact structure and is easy to operate.

In order to achieve the above objective, the present invention provides a valve including a valve body, a valve stem, a valve cartridge and a valve seat, the valve body having an inlet and an outlet, an inner space being formed between the inlet and the outlet for accommodating the valve cartridge, the valve seat being arranged inside the outlet, the valve seat being rotatable around an axis to open or close the valve, wherein the valve further includes a transmission device to transmit the movement of the valve stem to the valve cartridge and a position limiting device for limiting the movement sequence of the valve cartridge;

the valve cartridge has a recess, at least one portion of the transmission device being placed in the recess of the valve cartridge and forming a first transmission relationship and a second transmission relationship with the recess of the valve cartridge;

the first transmission relationship is a radial rotation of the valve cartridge driven by the transmission device, and the first transmission relationship is changed to the second transmission relationship for the transmission device and the valve cartridge when the first transmission relationship is finished, and the second relationship is a pressing movement of the valve cartridge relative to the valve seat driven by the transmission device, and the pressing movement renders the valve cartridge at least a radial component of movement;

wherein the position limiting device is used to limit movement of the valve cartridge during a process that the valve is opened, so that the transmission device drives the valve cartridge disengaging from the valve seat before the valve is axially moved, and does not prevent the valve from closing during a process that the valve is closed.

In a preferable embodiment, the position limiting device consists of a protrusion provided on any one of an inner wall of the valve body and the valve cartridge and a protrusion or pit provided on the other of the inner wall of the valve body and the valve cartridge, the protrusion provided on any one of the inner wall of the valve body and the valve cartridge and the protrusion or pit provided on the other of the inner wall of the valve body and the valve cartridge have a mutually cooperating geometry shape and position relationship, and the geometry shape and position relationship are provided so that the protrusion provided on any one of the inner wall of the valve body and the valve cartridge and the protrusion or pit provided on the other of the inner wall of the valve body and the valve cartridge can be cooperated only after the first movement relation is changed to the second transmission relationship.

In another preferable embodiment, the position limiting device consists of a protrusion provided on any one of an inner wall of the valve body and the valve cartridge as well as a protrusion or pit provided on the other of the inner wall of the valve body and the valve cartridge, the protrusion provided on any one of the inner wall of the valve body and the valve cartridge and the protrusion or pit provided on the other of the inner wall of the valve body and the valve cartridge have a mutually cooperating geometry shape and position relationship, and the geometry shape and position relationship are provided so that the protrusion provided on any one of the inner wall of the valve body and the valve cartridge and the protrusion or pit provided on the other of the inner wall of the valve body and the valve cartridge will not cooperate when the valve is in the first transmission relationship so as to not prevent the valve from opening or closing, and the protrusion provided on any one of the inner wall of the valve body and the valve cartridge and the protrusion or pit provided on the other of the inner wall of the valve body and the valve cartridge will cooperate after the second transmission relationship is finished during the process that the valve is closed.

In another preferable embodiment, the position limiting device consists of a valve body protrusion provided on a top wall of an inner wall of the valve body and a valve cartridge protrusion provided on the top of the valve cartridge, and a geometry shape and position relationship between the valve body protrusion provided on the top wall of the inner wall of the valve body and the valve cartridge protrusion provided on the top of the valve cartridge is provided so that the valve body protrusion and the valve cartridge protrusion will not cooperate with each other when the valve is in the first transmission relationship during the process that the valve is closed, and the valve body protrusion and the valve cartridge protrusion will cooperate with each other when the valve is in the second transmission relationship during the process that the valve is closed so that the second transmission relationship for the valve is not changed to the first transmission relationship before the second transmission relationship is finished.

In another preferable embodiment, the position limiting device consists of a valve body protrusion provided on an inner wall of the valve body and a valve cartridge protrusion provided on the valve cartridge, and a relative position relationship between the valve body protrusion provided on the inner wall of the valve body and the valve cartridge protrusion provided on the valve cartridge is provided so that the valve body protrusion provided on the inner wall of the valve body and the valve cartridge protrusion provided on the valve cartridge will cooperate with each other before the valve cartridge is disengaged from the valve seat during the process that the valve is opened and the valve body protrusion and the valve cartridge protrusion will not cooperate with each other after the valve cartridge departs from pressing the valve seat.

In another preferable embodiment, the position limiting device consists of a valve body protrusion provided on a top wall of an inner wall of the valve body and a valve cartridge protrusion provided on the top of the valve cartridge, and a relative position relationship between the valve body protrusion provided on the top wall of the inner wall of the valve body and the valve cartridge protrusion provided on the top of the valve cartridge is provided so that the valve body protrusion on a top wall of an inner wall of the valve body and the valve cartridge protrusion on the top of the valve cartridge will cooperate with each other before the valve cartridge is disengaged from the valve seat during the process that the valve is opened and the valve body protrusion provided on the top wall of the inner wall of the valve body and the valve cartridge protrusion provided on the top of the valve cartridge will not cooperate with each other after the valve cartridge departs from pressing the valve seat.

Preferably, the relative position relationship between the valve body protrusion provided on the top wall of the inner wall of the valve body and the valve cartridge protrusion provided on the top of the valve cartridge is provided so that the valve body protrusion provided on the top wall of the inner wall of the valve body and the valve cartridge protrusion provided on the top of the valve cartridge will not contact with each other before it is switched to the second transmission relationship during the process that the valve is closed.

In another preferable embodiment, the transmission devise is a transmission member in one piece, at least one portion of the transmission member is provided in a recess of the valve cartridge, a radially inward convex is formed in the recess, a radially outward convex is formed on the transmission member, the transmission member is further provided with resilient ribs, the resilient ribs and an inner wall of the recess have detachable connection relationship, and the resilient ribs are connected to the inner wall of the recess so that the transmission member and the valve cartridge have the first transmission relationship, the radially inward convex cooperates with the radially outward convex so that the transmission member and the valve cartridge have the second transmission relationship, the resilient ribs are disconnected to the inner wall of the recess so that the transmission member can rotate in the valve cartridge and be switchably in the first transmission relationship or the second transmission relationship with the cartridge; and the position limiting device consists of a valve body protrusion provided on the valve body and a valve cartridge protrusion provided on the valve cartridge, and the valve body protrusion and the valve cartridge protrusion are arranged so as to not prevent the valve cartridge from moving during the process that the valve is closed and prevent the valve cartridge from rotating relative to the valve seat before the valve cartridge is disengaged from the valve seat during the process that the valve is opened.

In another preferable embodiment, both ends of the valve cartridge are provided with recesses, a radially inward convex is formed in the recesses; the transmission device includes two actuators, any one of the two actuators is provided with a radially outward convex and resilient ribs; at least one portion of the two actuators is provided in recesses on both ends of the valve cartridge respectively; the resilient ribs and an inner wall of the recess have detachable connection relationship; the first transmission relationship is a rotation of the valve cartridge around the axis driven by rotation of the actuators; the second transmission relationship is a radial movement of the both ends of the valve cartridge pressing against the valve synchronously driven by rotation of the actuators; and rotation of the actuators under resilient action of the resilient ribs drives the both ends of the valve cartridge to radially move, thereby synchronously disengaging from the valve and then the actuators drives the valve cartridge to rotate around the axis; wherein the position limiting device consists of a valve body protrusion provided on a top wall and a bottom wall inside the valve body and a valve cartridge protrusion provided on both ends of the valve cartridge, and the valve body protrusion and the valve cartridge protrusion are arranged so as to not prevent the valve cartridge from moving during the process that the valve is closed and prevent the valve cartridge from rotating relative to the valve seat before the valve cartridge is disengaged from the valve seat during the process that the valve is opened.

In the above two preferable embodiment, the radially inward convex is successively provided with a position limiting protrusion, a starting portion, an intermediate portion and a termination portion, wherein the position limiting protrusion is used to limit a position of the radially outward convex so that the radially outward convex is not disengaged from the radially inward convex during rotating; the starting portion is a slop, and the valve cartridge will radially move and press against the valve seat when the radially outward convex moves along the starting portion; the intermediate portion is a flat plane used to have the radially outward convex stay on the intermediate portion; and the termination portion is a protrusion at an end of the radially inward convex for stopping the radially outward convex, so as to prevent the radially outward convex from moving beyond the radially inward convex during rotating.

Preferably, an inner wall of the recess is provided with position limiting pits in which resilient ribs can snap in or from which resilient ribs can be disengaged, wherein rotation of the actuators can drive the cartridge rotating around an axis when the resilient ribs are snapped into the position limiting pits and the cartridge will press against the valve seat of the valve and radially move under mating action of the outward convex and inward convex when resilient ribs are detached from position limiting pits.

Preferably, the actuator located on the top of the valve cartridge has a plate-like body, and a connecting hole for connecting to the valve stem is provided at the center of the plate-like body, wherein the outer profile of the plate-like body is provided with a radially outward convex and two resilient ribs.

Preferably, the actuator located on the top of the valve cartridge has a plate-like body, a radially outward convex and two resilient ribs are provided at the peripheral contour of the plate-like body, a cylinder is extended from the center of the bottom surface of the plate-like body and a positioning pillar is extended from the center of the upper surface of the plate-like body, wherein the positioning pillar is connected to the transmission member so as to transmit the rotation of the valve stem to the actuator.

Preferably, the bottom wall of the recesses provided on the top and bottom of the valve cartridge is provided with a long positioning hole, and the bottom of the valve cartridge is provided with a lug boss, wherein positioning limiting protrusions are provided on the periphery of the lug boss for engaging with the positioning limiting members in the valve body of the valve so as to prevent the valve cartridge from rotating beyond a predetermined degree.

Preferably, the transmission member has a U-shaped body and positioning holes are provided on two arms of the U-shaped body respectively, wherein the cross-section shape of the positioning holes matches the cross-section shape of the positioning pillar of the valve stem and the cross-section shape of the positioning pillar of the actuator.

Preferably, the connecting hole located on the center of the plate-like body of the actuator on the top of the valve cartridge is a spline hole for engaging with a spline of the valve stem of the valve, so that the actuator on the top of the valve cartridge can be driven to rotate when the valve stem is rotated.

In another preferable embodiment, the transmission device includes a transmission member and a sliding rod;

the valve cartridge has a recess; the transmission member is connected to an end of the valve stem and can rotate along with the rotation of the valve stem; at least one portion of the transmission member is provided in the recess of the valve cartridge; a radially inward convex is provided in the inner periphery wall of the recess; a radially outward convex is provided on the transmission member; the valve stem is provided with a stem inner chamber on the end of the valve stem for accommodating the sliding rod; and the valve body is provided with an inward convex surrounding the valve stem;

the inward convex of the valve body presses against the sliding rod and drives the sliding rod to radially move in the stem inner chamber and the valve cartridge is synchronously driven to rotate by the sliding rod to form the first transmission relationship when the valve stem is rotating; the radially outward convex of the transmission member at the end of the valve stem cooperates with the radially inward convex of the recess of the valve cartridge so that the rotation of the transmission member around the same axis is changed to a radial movement of the valve seat by the valve cartridge pressing against the valve body thereby forming the second transmission relationship, when the sliding rod in the valve stem moves along a radial movement until the radially inward convex drives the sliding rod to be disengaged from with the valve cartridge;

wherein the position limiting device consists of a valve body protrusion provided on the valve body and a valve cartridge protrusion provided on the valve cartridge, the valve body protrusion and the valve cartridge protrusion are arranged so as to not prevent the valve cartridge from moving during the process that the valve is closed and prevent the valve cartridge from rotating relative to the valve seat before the valve cartridge is disengaged from the valve seat during the process that the valve is opened.

Preferably, the sliding rod includes a rod body, a protrusion and a sliding pole reversely-extending from both ends of the rod body and perpendicular to the rod body, the sliding pole is provided in the stem inner chamber, and the protrusion of the sliding rod and the radially inward convex provided in the inner periphery wall of the recess of the valve cartridge have a detachable connecting relationship.

Preferably, the radially inward convex provided in the inner periphery wall of the recess of the valve cartridge is provided with at least two pits and a protrusion which spaces the two pits; one of the two pits is detachably connected to the radially outward convex of the transmission member; and the other of the two pits is detachably connected to the protrusion of the sliding rod.

Preferably, the valve stem includes a transmission rod and a supporting portion coaxially extending from the bottom surface of the valve stem, wherein the transmission member is further provided with a transmission hole for engaging with the transmission rod and the recess is further provided with long positioning hole for engaging with the supporting portion.

Preferably, the supporting portion is a cylindrical member and the long positioning hole is a hole having two parallel sides and two cambered ends.

Preferably, the transmission rod is a spline rod and the transmission hole is a spline hole for engaging with the spline rod.

Preferably, the sliding pole of the sliding rod is cylinder and the protrusion of the sliding rod is a cuboid, wherein surface of the cuboid for engaging with the pits is circular surface.

Preferably, the radially outward convex of the transmission member substantially has a rectangular shape and two axially outer corners of the radially outward convex are rounded or beveled.

In the valve of the present invention, as the valve cartridge does not contact with the valve seat or the valve body and is in a vacant state during the pre-closing or opening of the valve cartridge, the frictional force between them is reduced and the torque is reduced as well (the spherical valve cartridge is pressed only at the moment when the valve is closed), so that the torque is very small during the process that the valve stem rotates, thereby achieving the effect that the valve is opened and closed in low torque.

Furthermore, when the valve need to be opened, the valve stem is reversely rotated and the rotation of the valve stem drives the valve cartridge to move. No matter whether there is a friction when the valve cartridge pressure-contacts the valve seat, the positioning limiting structures (the positioning limiting protrusions) provided on the valve cartridge and on the valve body make the valve cartridge axially rotate only when the valve cartridge is changed from the seal state to the pre-opening state, that is, the valve cartridge is disengaged with the valve seat, otherwise, the valve will not be opened even if there is no frictional force between the valve body and the valve seat. In other words, there will be a clear switching relationship of sealing for the valve cartridge of the valve, due to the positioning limiting structures provided on the valve cartridge and on the valve body, and no matter what environment for use, there is no problem of the friction between the cartridge and the seal ring, so that opening and closing of the valve is more safe.

DESCRIPTION OF DRAWINGS

FIGS. 5a-5b show a schematic structure view of the actuator located on the top end of the valve cartridge of the valve according to an embodiment of the present invention, wherein FIG. 5a is a perspective view and FIG. 5b is a top view;

FIGS. 6a-6b show a schematic structure view of the actuator located on the bottom end of the valve cartridge of the valve according to an embodiment of the present invention, wherein FIG. 6a is a perspective view and FIG. 6b is a top view;

FIGS. 7a-7d show a schematic structure view of the valve cartridge of the valve according to a first embodiment of the present invention, wherein FIGS. 7a and 7c are a perspective view, FIG. 7b is a top view, and FIG. 7d is a bottom view;

FIG. 13 shows an exploded perspective view of the valve according to another embodiment of the present invention;

MODE FOR CARRYING OUT THE INVENTION

Figure 1:
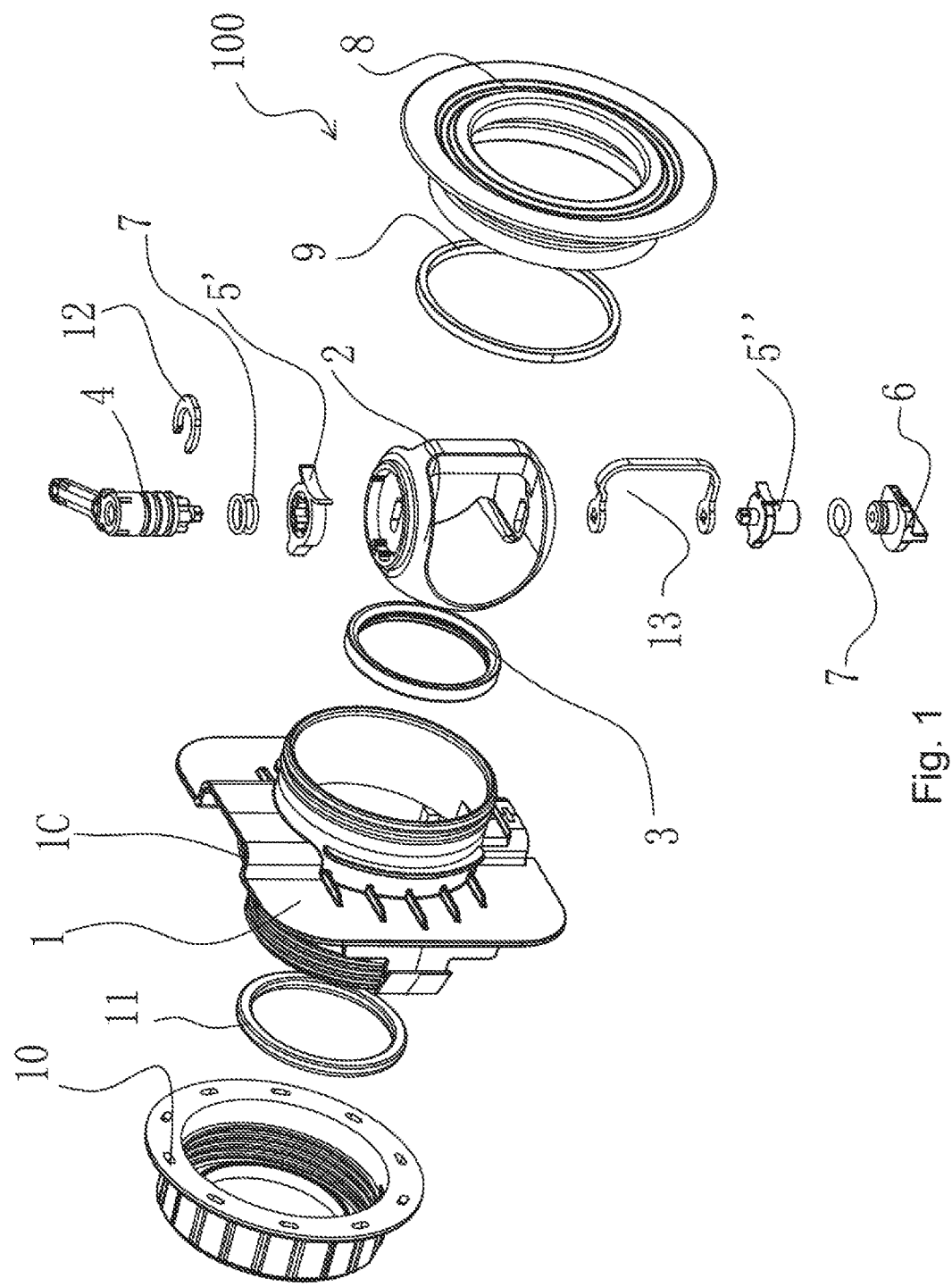
FIG. 1 shows an exploded perspective view of the valve according to an embodiment of the present invention.

Firstly, it should be appreciated that the specific embodiments of the present invention are not limited to the following examples. The person skilled in the art should understand the present invention from spirit embodied in the following embodiments. The technical term may have broad meaning based on the essence of the spirit of the present invention, for example, a valve stem is a member used to operate a valve cartridge.

Hereinafter, preferred embodiments of the present invention will be described in detail with reference to the drawings. It should be noted that same or similar components are denoted by same reference numerals; and for the sake of clarity, the relevant components is omitted in a schematic diagram. Herein, top, down, left, and right directions refers to the top, down, left, and right directions from the figure, unless otherwise specified.

Figure 2:
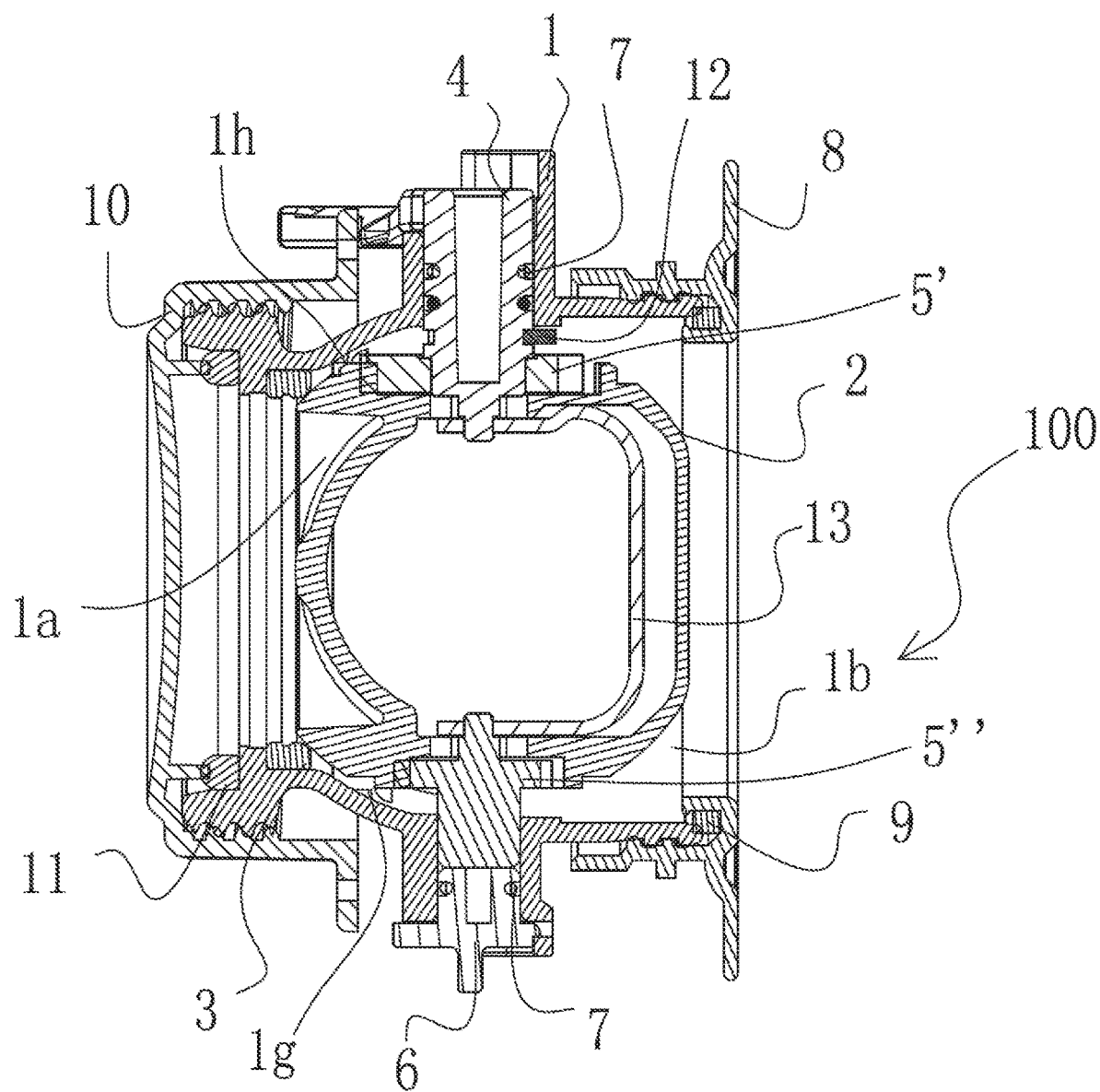
FIG. 2 shows a sectional view of the valve according to an embodiment of the present invention.

FIG. 1 shows a perspective view of the valve according to the first embodiment of the present invention. FIG. 2 shows a sectional view of the valve 100 in FIG. 1 after being assembled. In the present embodiment, the valve is a ball valve. As shown in FIG. 1, ball valve 100 includes a valve body 1, a valve cartridge 2, a valve seat 3, a valve stem 4, an upper actuator 5', a lower actuator 5", a positioning member 6, an O-ring 7, a valve cover 10, a gasket ring 9, a gasket ring 11, a snap 12, and a transmission member 13. Wherein the valve cartridge assembly of the invention consist of valve cartridge 2, the upper actuator 5', the lower actuator 5", and the transmission member 13.

The left end of the valve body 1 (from the direction of the Figs., same as below) is sealing-covered by Valve cover 10 and gasket ring 11. The valve seat 3 is provided inside the valve body 1, and the valve cartridge 2 is mounted inside the valve body 1 through the lower actuator 5" and the positioning member 6 provided in the lower portion thereof. A flange 8 (or a connector provided on the liner bag of liquid container) is connected to the right end of the valve body 1, to seal the valve cartridge 2 into the valve body 1. The O-ring 9 is mounted between the flange 8 and the valve body 1. The valve stem 4 is connected to the actuator 5' and connected to the actuator 5" by the transmission member 13. The actuator 5' and the actuator 5" are engaged with the valve cartridge 2 respectively, so that the valve cartridge 2 is activated accordingly when the valve stem 4 is rotated, which will be described in more detail hereinafter.

Figure 3:
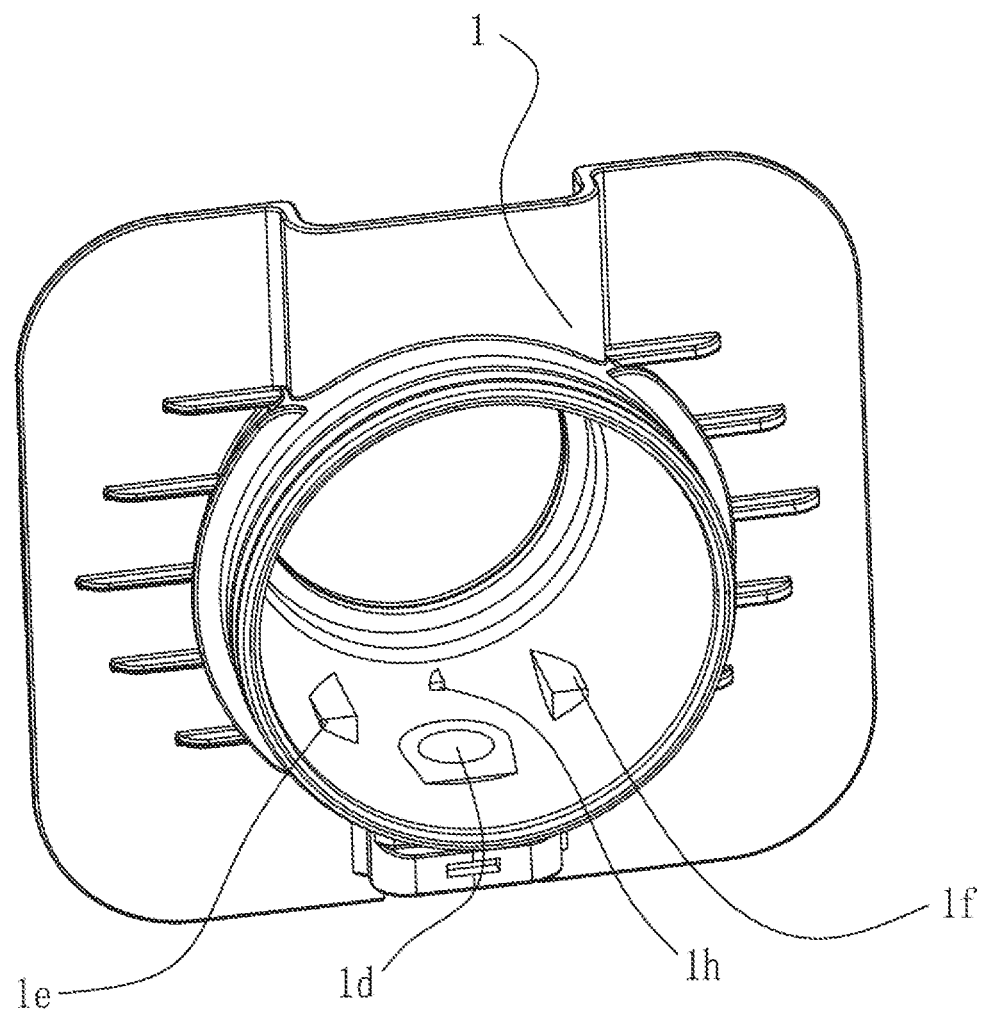
FIG. 3 shows a perspective view of the valve body of the valve according to an embodiment of the present invention.

FIG. 3 shows the perspective view of the valve body 1. As shown in FIGS. 1-3, the valve body 1 is a shell having an upper end, a lower end, a left side and a right side. An inner space is formed inside the shell for accommodating the valve cartridge 2, the valve seat 3, the actuators 5' and 5", the transmission member 13, and one portion of the valve stem 2. An inlet 1a and an outlet 1b are formed on the left side and right side of the shell along a horizontal axis (not shown in the Figs.) respectively for connecting the container and the outside. The valve seat 3 is provided on the inner side of the inlet 1a along the horizontal axis. A valve stem hole 1c and the lower through hole 1d are provided on the upper end and lower end of the valve body 1 respectively along a vertical axis (not shown in the Figs.) perpendicular to the horizontal axis. Position limiting members 1e and 1f are radially provided in the bottom of the valve body 1 and on both sides of the lower through-hole 1d. The position limiting members 1e and 1f are engaged with position limiting protrusions of the valve cartridge 2 respectively (which will be described in more detail hereinafter), so that the valve cartridge 2 can only rotate within the angle range of 90 degree within the valve body 1. Position limiting structures, provided on the top wall and lower wall of the inner space of the valve body, are engaged with the corresponding position limiting structures provided on the top and bottom of the valve cartridge, so as to restrict movement of the valve cartridge to a certain extent and make it move in a particular movement sequence during the process that the valve is opened.

In particular, the position limiting structures are a valve top wall protrusion 1h and a valve bottom wall protrusion 1g provided on the top wall and the bottom wall of the inner space of the valve respectively. The relative position of the valve top wall protrusion 1h and the valve bottom wall protrusion 1g as well as the corresponding protrusions provided on the valve cartridge is arranged to restrict movement of the valve to a certain extent during the process that the valve is opened, so that the valve cartridge will obey a particular movement sequence that the cartridge is firstly disengaged from the valve body and then axially rotated, and not prevent the valve from closing when the valve is closed, which will be described in more detail hereinafter.

As shown in FIG. 2, the valve stem 4 is rotatably accommodated in the valve stem hole 1c. The positioning member 6 is accommodated in the lower through-hole 1d of the valve body 1 and is sealed and secured from the wall of the lower through-hole 1d through the O-ring 7, wherein the top surface of the positioning member 6 contacts with the actuator 5". It should be noted that the positioning member is a dependent member in the present embodiment, however the person skilled in the art can understand that it may be integrally formed on the bottom of the valve body or may be the other members as long as it can provide rotational degrees of freedom around a vertical axis for the actuator 5" when supporting the actuator 5".

Figure 4:
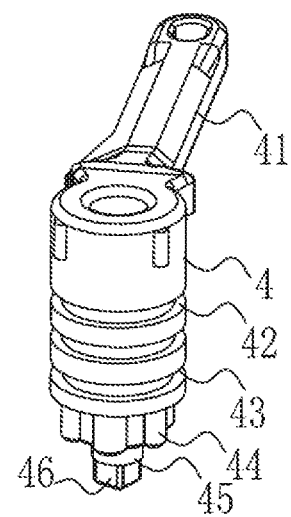
FIG. 4 shows a perspective view of the valve stem of the valve according to an embodiment of the present invention.

FIG. 4 shows a perspective view of the valve stem of the valve according to an embodiment of the present invention. As shown in FIG. 4, a handle 41 is integrally provided on the top end of the valve stem 4. The valve stem 4 can be actuated rotating around a vertical axis by wrenching the handle 41. A sealing groove 42 and a snap groove 43 are formed in the central portion of the valve stem 4. The O-ring 7 can be embedded in the sealing groove 42 to prevent fluid leakage from the valve stem. The snap groove 43, which is engaged with the sealing groove 42, plays a role in blocking and limiting the valve stem 4, so that the valve stem 4 can not be removed from the valve body 1. A spline 44 is formed on the lower end of the valve stem 4 and can be engaged with the spline hole 51 provided on the actuator 5' (see FIG. 5a), so that the actuator 5' can be driven to rotate by the valve stem 4 when valve stem 4 rotates.

It should be noted that the function of the spline 44 and the spline hole 51' is to transmit the rotating of the valve stem to the actuator 5', so that the actuator 5' can rotate correspondingly. Therefore, the person skilled in the art should understand that the above transmitting relationship can achieved by other structures, for example, the lower end of the valve stem 4 is a transmission portion with a triangular cross-section or a square cross-section and the actuator 5' is provided with corresponding transmission hole such as triangular or square holes and so on. A guiding rod 45 is extended from the bottom end of the spline 44 for engaging with the long positioning hole provided on the valve cartridge 2, so as to guide the moving direction of the cartridge, which will be described in more detail hereafter. A positioning pillar 46 having a square cross-section is formed on the bottom end of the guiding role for engaging with a positioning hole provided in the transmission member 13 (which will be described in more detail hereafter), so that the rotating of the valve stem 4 can drive the transmission member 13 to rotate. It should be noted that the positioning pillar 46 may have other cross-section, such as triangular, hexagonal, or splined cross-section and so on, when the positioning hole of the transmission member 13 has the corresponding shape for engaging with the shape of cross-section of the positioning pillar 46.

Figure 5A:
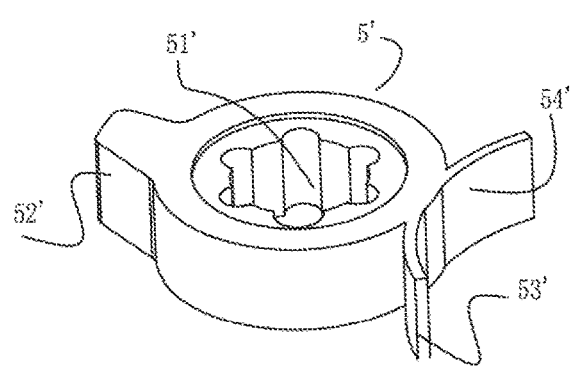
Figure 5B:
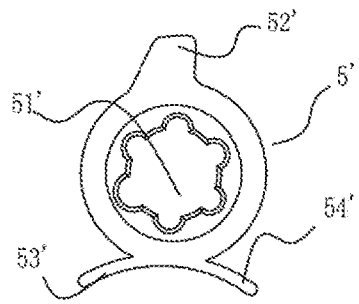

FIG. 5a shows a perspective view of the actuator 5'. FIG. 5b shows the top view of the actuator 5'. As shown in FIGS. 5a and 5b, the actuator 5' is a plate-like member, which has a spline hole 51' provided in the center thereof. The actuator 5' is formed with a radially outward convex 52' and two resilient ribs 53' and 54' opposite to the radially outward convex 52' on the outer profile thereof. The radially outward convex 52' is engaged with a radially inward convex of the valve cartridge 2, and the resilient ribs 53' and 54' may be releasable fit with the positioning pits provided on the valve cartridge 2, so as to open and close the valve in low torque, which will be described in more detail hereinafter.

Figure 6A:
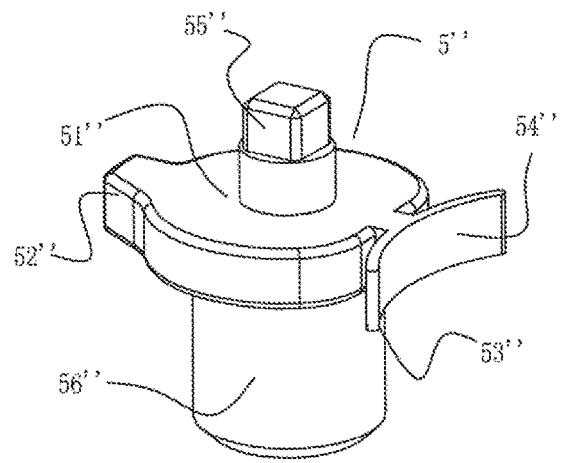
Figure 6B:
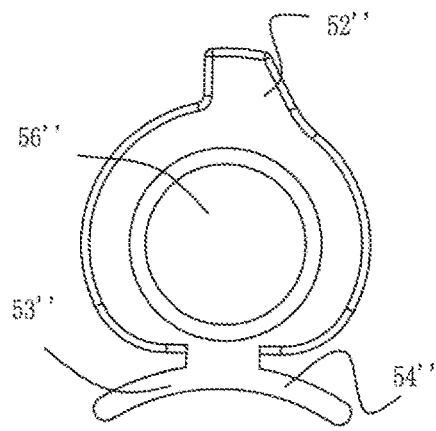

FIG. 6a shows a perspective view of the actuator 5". FIG. 6b shows the bottom view of the actuator 5". As shown in FIGS. 6a-6b, the actuator 5" has a plate-like body 51". A positioning pillar 55" having a square cross-section is integrally extended from the center of the upper surface of the actuator 5" for engaging with another positioning hole of the transmission member 13 (which will be described in more detail hereinafter), so that the rotating of the transmission member 13 can drive the actuator 5" to rotate. It should be noted that the positioning pillar 55" may have other cross-sections, such as triangular, hexagonal, or splined cross-sections and so on, when the another positioning hole of the transmission member 13 has the corresponding shape for engaging with the shape of cross-section of the positioning pillar 52".

A cylinder 56 is integrally extended from the center of the bottom surface of the plate-like body 51". The positioning pillar 55" and the cylinder 56" have a center along the same axis. The cylinder 56" can be accommodated in the lower through-hole 1d at the bottom of the valve body 1, so that the actuator 5" can rotate around the center axis of the lower through-hole 1d. The outer profile of the plate-like body 51" is identical with that of the actuator 5'. That is, the outer profile of the plate-like body 51" includes a radially outward convex 52" and two resilient ribs 53" and 54".

FIGS. 7a-7d shows the particular structure of the valve cartridge 2 according to an embodiment of the present invention. As shows in FIGS. 7a-7c, in the present embodiment, the valve cartridge 2 is in a form of a substantially hollow spherical shell and has a spherical body 21 with an axis (a vertical axis, not shown in the Figs.), around which the valve cartridge 2 can rotates. A recess 22 is provided on the top wall of the spherical shell along the direction of the vertical axis. The recess 22 has a radially inward convex 23 and two position limiting pits 24, 25 provided on the side wall thereof and a long positioning hole 26 provided on the bottom wall thereof.

The radially inward convex 23 includes a positioning limiting protrusion 23a, a starting portion 23b, an intermediate portion 23c and a termination portion 23d opposite to the position limiting pits 24, 25. The positioning limiting protrusion 23a is a protrusion provided on the side wall of the recess 22 for limiting the position of the radially outward convex 52' and further limiting the position of the valve cartridge, so that the radially outward convex 52' is not disengaged from the radially inward convex 23 during the process of rotating. The starting portion 23b is slop. When the radially outward convex moves along the starting portion (when the valve cartridge and the actuator pressed against each other), the valve cartridge radially moves through pressing against the valve seat. The intermediate portion is a flat plane, on which the radially outward convex can be steadily and immovably remained. The termination portion is a protrusion of the end of the radially inward convex 23 for stopping the radially outward convex 23, so as to prevent the radially outward convex 23 from moving beyond the radially inward convex during rotating. The radially outward convex of the valve cartridge contacts with the termination portion 23d when the radially outward convex of the valve cartridge is located on the intermediate portion 23c, and the actuator 5 and the valve cartridge 2 is in a relative static state due to the limiting function of a step surface of the termination portion, thereby the valve cartridge pressing against the valve seat and closing the valve.

The long positioning hole 26 is an elongated hole with two parallel sides and two arc end for engaging with the guiding rod 45 of the valve stem 4.

Figure 8:
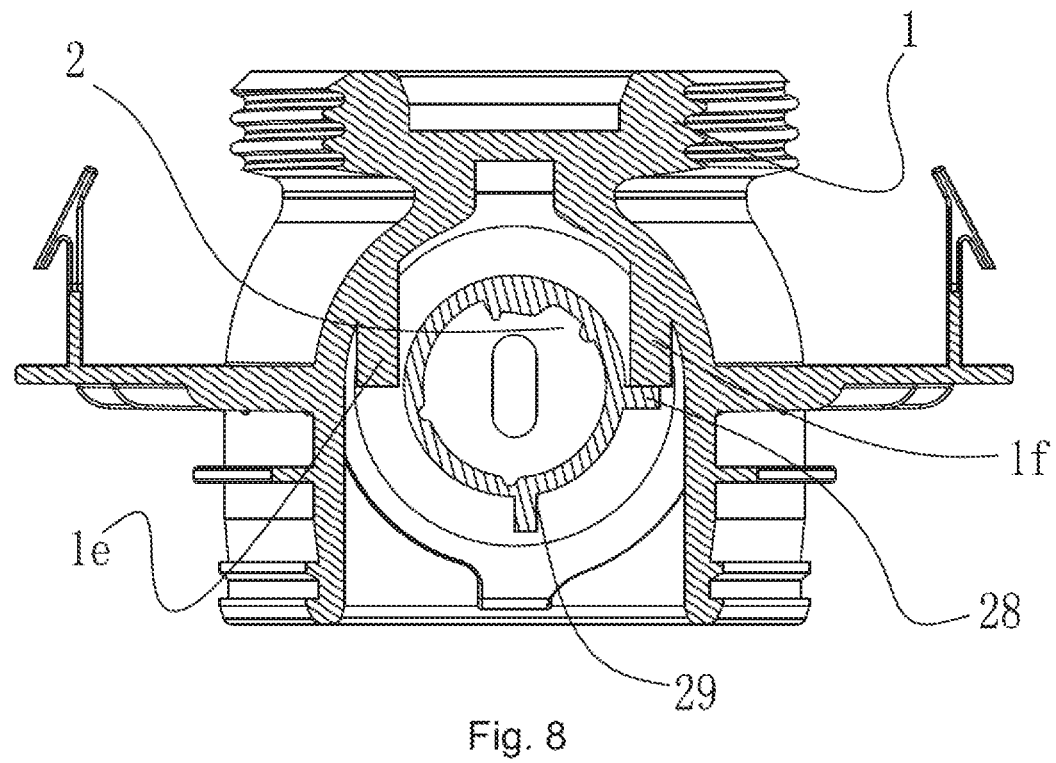
FIG. 8 is a sectional view which is partially cut to show a relative position of the position limiting structure provided on the bottom end of the valve cartridge and the position limiting structure of the valve body when the valve cartridge rotates to the closing-position.
Figure 9:
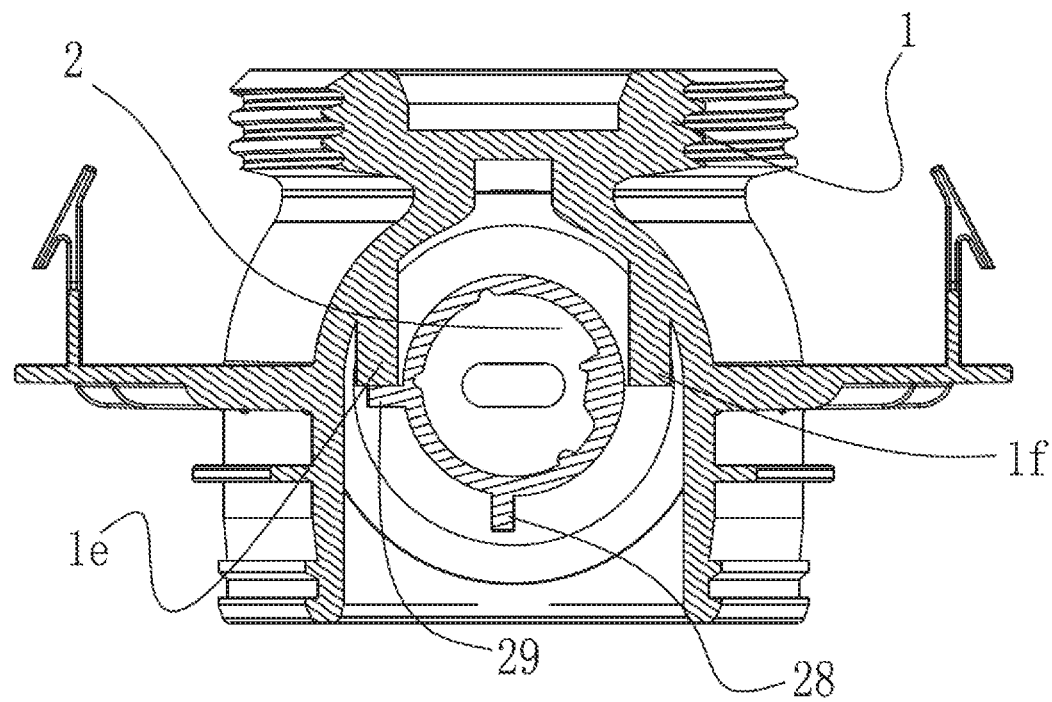
FIG. 9 is a sectional view which is partially cut to show a relative position of the position limiting structure provided on the bottom end of the valve cartridge and the position limiting structure of the valve when the valve cartridge rotates to the full opening-position.

As shown in FIG. 7c, a lug boss 27 is provided on the bottom end of the spherical body. Positioning limiting protrusions 28, 29 are provided on the outer periphery of the lug boss 27 for engaging with the positioning limiting members 1e and 1f of the valve body 1. The positioning limiting protrusions 28, 29 form a 90 degree angle between them. The positioning limiting protrusion 28 is engaged with the positioning limiting member 1f (as shown in FIG. 8) when the valve cartridge is rotated to the pre-closing position during the process that the valve is closed, so as to prevent the valve cartridge to be rotated beyond 90 degree (or to prevent the valve cartridge from bring rotated beyond predetermined angle). The positioning limiting protrusion 29 is engaged with the positioning limiting member 1e (as shown in FIG. 9) when the valve cartridge is rotated to the full open position during the process that the valve is opened, so as to prevent the valve cartridge from being rotated beyond 90 degree As shown in FIG. 7d, the lug boss 27 is provided with a recess 22" at the central portion thereof. The recess 22" is provided with a radially inward convex 23" and two pits 24", 25" on the side wall thereof and a long positioning hole 26" on the bottom wall thereof. The shape of the radially inward convex 23" is identical with that of the radially inward convex 23 at the top end of the valve cartridge, that is, the radially inward convex 23" includes a positioning limiting protrusion 23"a, a starting portion 23"b, an intermediate portion 23"c and a termination portion 23"d in turn. The shape of the long positioning hole 26" is identical with that of the long positioning hole 26 provided on top end of the valve cartridge.

A position limiting structures, provided on the top and bottom of the valve cartridge, are engaged with the corresponding position limiting structures of the valve body, so as to restrict movement of the valve cartridge to a certain extent and make it move in a particular movement sequence during the process that the valve is opened.

In particular, the corresponding position limiting structures of the valve cartridge are a valve cartridge top protrusion 21a and a valve cartridge bottom protrusion 21b provided on the top and the bottom of the valve cartridge respectively. Alternatively, the valve cartridge may also be provided with a valve cartridge protrusions and the valve body is provided with a valve body pits. Alternatively, the valve cartridge may also be provided with a pits and the valve body is provided with protrusions on the inner wall thereof. The protrusions provided on any one of the inner wall of the valve body and the valve cartridge have corresponding geometry shapes and position relationships with the protrusions or pits provided on the other of the inner wall of the valve body and the valve cartridge. The geometry shapes and position relationships can be engaged with each other only when the first transmission relationship is changed into the second transmission relationship, that is, when the transmission relationship that the transmission device drive the valve cartridge to axially rotates is changed into the transmission relationship that the transmission device drive the valve cartridge to press against the valve seat. Preferably, the protrusions provided on any one of the inner wall of the valve body and the valve cartridge is only engaged with the protrusions or pits provided on the other one of the inner wall of the valve body and the valve cartridge when the second transmission relationship is completed during the process that the valve is opened. In other words, when the first transmission relationship is changed into the second transmission relationship, the valve cartridge moves toward the valve seat, the geometry shapes of the valve cartridge moves toward the valve body with the valve cartridge, and the geometry shapes of the valve cartridge are engaged with the valve body after the pressing of valve cartridge against the valve seat is completed. The protrusions provided on any one of the inner wall of the valve body and the valve cartridge is not engaged with the protrusions or pits provided on the other one of the inner wall of the valve body and the valve cartridge when the valve is in the first transmission relationship, so as to not affect the opening and closing of the valve.

The valve cartridge top protrusion 21a and the valve cartridge bottom protrusion 21b are engaged with the valve top wall protrusion 1h and the valve bottom wall protrusion 1g respectively during the process that the valve is opened, so that the valve cartridge can not be radially rotated before departing from pressing the valve body, i.e. before reaching a pre-opening state, and can not preventing the valve from being closed during the process that the valve is closed. The relative position of the valve top wall protrusion 1h and the valve cartridge top protrusion 21a is arranged so that the valve cartridge top protrusion 21a and the valve cartridge bottom protrusion 21b are engaged with the valve top wall protrusion 1h and the valve bottom wall protrusion 1g respectively before the valve cartridge departs from contacting with the valve seat, and disengaged with the valve top wall protrusion 1h and the valve bottom wall protrusion 1g after the valve cartridge departs from pressing the valve seat.

Figure 10:
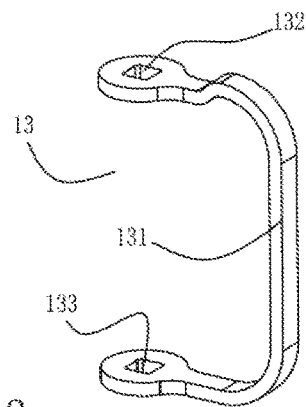
FIG. 10 shows a perspective view of the transmission member of the valve according to an embodiment of the present invention.

FIG. 10 shows a perspective view of the transmission member 13 of the valve assembly according to an embodiment of the present invention. As shown in FIG. 8, the transmission member 13 has a substantially U-shaped body 131. Positioning holes 132 and 133 having a quadrilateral cross-section are provided on two arms of the U-shaped body 131. However, the person skilled in the art should understand that the positioning holes 132 and 133 can have other cross-section shapes, such as triangle shapes, polygonal shapes and so on or irregular shapes, as long as the shapes can correspond to the cross-section shapes of the positioning pillar 46 of the valve stem 4 and the cross-section shapes of the positioning pillar 55" of the actuator 5". It should be noted that the transmission member 13 can have other structures or shapes, as long as it can transmit the movement of the valve stem to the actuators 5' and 5".

As shown in FIG. 2, after being assembled, the valve stem 4 passes through the valve stem hole 1c located on the upper portion of the valve body 1 and the spline hole 51' of the actuator 5' successively, and is inserted into the long positioning hole 26 of the valve cartridge 2, and the positioning pillar 46 provided on the end of the valve stem 4 is inserted into the transmission hole 132 of the transmission member 13. The O-ring 7 is sealed between the valve stem 4 and the valve body 1. The snap groove 43 of the valve stem 4 is connected with the snap 12, which plays a role in blocking and limiting the valve stem, so that the valve stem 4 can not be removed from the valve body 1. The spline 44 of the valve stem 4 is inserted into the actuators 5' to transmit movement. The guiding rod 45 of the valve stem is accommodated into the long positioning hole 26, which is mainly used to forcibly guide the valve cartridge to radially move (i.e. radially move along the long positioning hole) through engaging with the guiding rod 45 of the valve stem.

Figure 14:
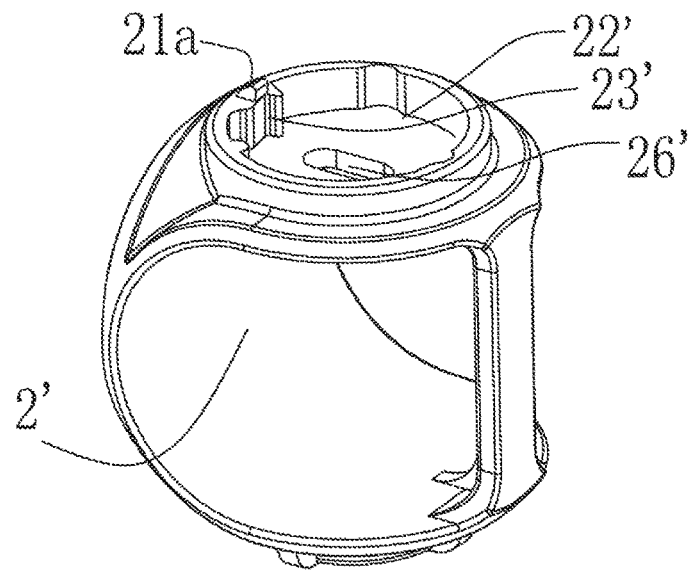
FIG. 14 shows a perspective structure of the valve cartridge according to the present embodiment.

As shown in FIG. 14, the actuator 5' is located in the recess 22 provided on the top of the valve cartridge 2. Ends of the resilient ribs 53 and 54 are snapped in the positioning pits 24 and 25 respectively and apply a certain elastic pressure to the radially inward convex 23 of the top end of the valve cartridge 2 due to being pressed.

The actuator 5" is rotatably located in the lower throughhole 1d of the valve body 1 by the positioning member 6. The positioning pillar 55" of the actuator 5" passes through the long positioning hole 26" provided on the bottom of the valve cartridge 2" and is inserted into the positioning hole 133 of the transmission member 13, so that the rotation of the transmission member 13 can drive the actuator 5" to rotate and forcibly guide the valve cartridge to radially move (i.e. radially move along the long positioning hole). The plate-like body 51" of the actuator 5" is located in the recess 22" provided on the bottom of the valve cartridge 2". Two resilient ribs 53" and 54" are snapped in two pits 24" and 25" of the recess 22" and apply a certain elastic pressure to the radially inward convex at the bottom end of the valve cartridge 2 due to being pressed.

Accordingly, the actuators 5' and 5" can drive the valve cartridge 2 to rotate synchronously when the rotational resistance of the valve cartridge 2 is smaller through connecting of the pits provided on the top of the valve cartridge 2 and the two resilient ribs of the actuator 5' and connecting of the pits 24", 25" provided on the bottom of the valve cartridge 2" and the two resilient ribs of the actuator 5".

Figure 11:
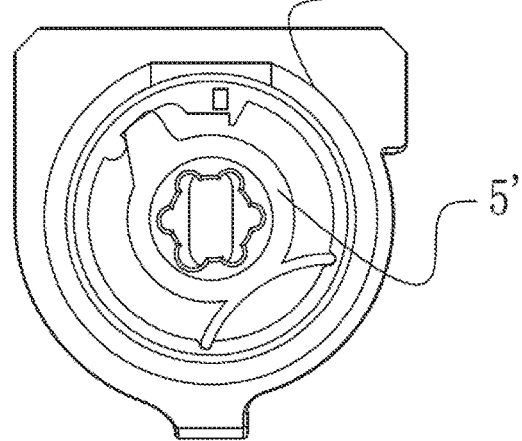
FIGS. 11a and 11b are top views, showing the relative position of the valve cartridge and the actuator of the valve according an embodiment of the present invention, wherein the resilient ribs is snapped into the pits of the recess of the valve cartridge.
Figure 12A:
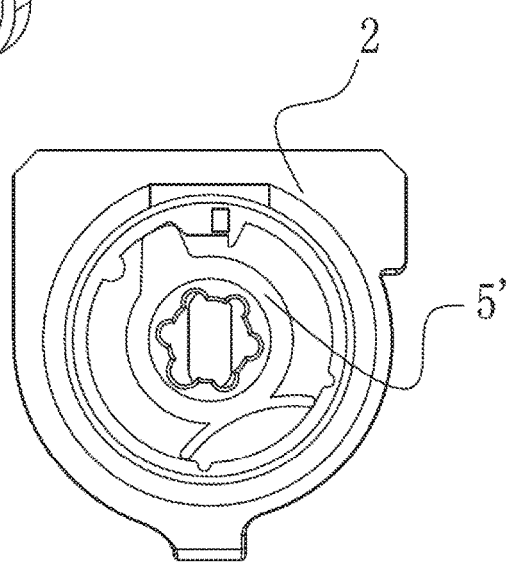
FIGS. 12a and 12b are top views, showing the relative position of the valve cartridge and the actuator according an embodiment of the present invention, wherein the resilient ribs is disengaged from the pits of the recess of the valve cartridge.
Figure 11B:
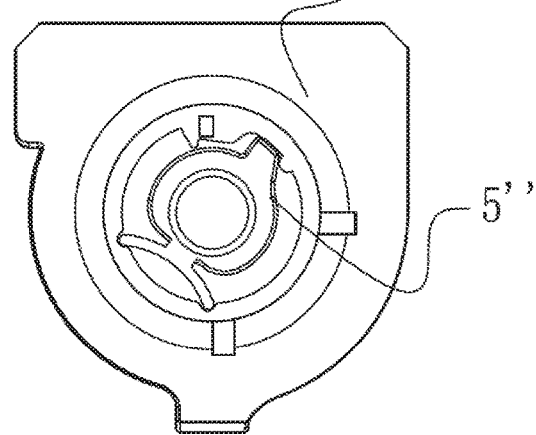
Figure 12B:
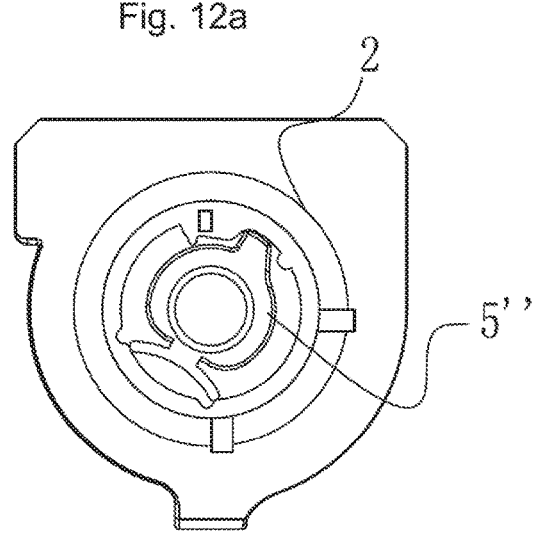

The valve stem rotates and drives the transmission member to actuate the bottom actuator via the engagement of the square positioning pillar and the square positioning hole of the transmission member when the state of the valve is changed from opening to closing. The resistance of the valve cartridge when rotating is frictional force of connecting members as the valve cartridge does not contact with the valve seat when the valve is opened, thus the resistance of the valve cartridge is very small and almost negligible. Then ends of the resilient ribs of the actuators located on the top end and bottom end of the valve cartridge respectively are connected to the two pits of the recesses located on the top end and bottom end of the valve cartridge so that both of the actuators can drive the valve cartridge to rotate synchronously (as shown in FIGS. 11a and 11b). The closed end of the valve cartridge contacts with or is in alignment with the valve seat when the valve cartridge rotates about 90 degree, and the position limiting structures provided on the bottom end of the valve body and the valve cartridge make the valve cartridge only rotate in the angle range of 90 degree within the valve body. Ends of the resilient ribs of the actuators located on the top end and bottom end of the valve cartridge respectively are disengaged from the pits of the recesses (as shown in FIGS. 12*a* and 12*b*) when the valve stem is applied with increasing rotating torque after the valve cartridge rotates about substantially 90 degree, so that the radially outward convex of the actuator rotates along the radially inward convex of the valve cartridge and the upper end and lower end of the valve cartridge radially move synchronously (obtaining radial component of movement). Then the actuators located on the top end and bottom end of the valve cartridge are engaged with the long positioning hole provided in the recess of the top end and lower end of the valve cartridge and forcibly guide the valve cartridge to radially move. The valve cartridge applies predetermined pressure to the valve seat and the valve cartridge and the valve seat are engaged with each other in a predetermined pressure when the radially outward convex rotates from the starting portion to the termination portion of the radially inward convex, so that the passage of the valve is blocked and the valve is closed.

When the valve needs to be opened, the valve stem is reversely rotated and the rotation of the valve stem drives the transmission member to reversely rotate. As the valve cartridge top protrusion 21*a* and the valve cartridge bottom protrusion 21*b* are engaged with the valve top wall protrusion 1*h* and the valve bottom wall protrusion 1*g* respectively, the valve cartridge do not rotates along with the actuators. It should be noted that if the valve is not applied with a liquid with high lubricity such as oil, the protrusions 21*a*, 21*b* and the protrusions 1*h*, 1*g* may not be necessarily provided since there usually is a larger friction force between the valve cartridge and the valve seat pressed with each other. The radially outward convex of the actuator rotates from the termination portion to the starting portion of the radially inward convex and the resilient ribs provide restoring force to drive the actuator and the recess returning to the initial position. Then the pressure applied to the valve cartridge disappear and both the top end and lower end of the valve cartridge are synchronously disengaged from the valve seat, and the friction force between them disappears as well, so that the valve cartridge axially returns to the initial position to reach the pre-opened state. As the inner peripheral wall of the recess is provided with position limiting protrusions, when the transmission member reversely rotates, the radially outward convex can not reversely rotates relative to the valve cartridge when contacting with the position limiting protrusions. Then the ends of the two resilient ribs are embodied into the pits provided on the inner peripheral wall of the recess and the transmission member drives the valve cartridge reversely rotating about 90 degree so that the passage of the valve cartridge is unblocked under the interaction of the position limiting protrusions and the radially outward convex as well as the interaction of resilient ribs and the pits provided on the inner peripheral wall of the recess.

FIG. 13 shows an exploded perspective view of the valve 200 according to an embodiment of the present invention. As shown in FIG. 13, the difference between the present embodiment and the above embodiment is that: the valve cartridge is drive only on one end thereof in the present embodiment and is driven on both ends thereof in the above embodiment. In particular, in the present embodiment, the ball valve 200 includes a valve body 1, a valve cartridge 2', a valve seat 3, a valve stem 4, an upper actuator 5', a positioning member 6', an O-ring 7, a valve cover 10, a ring 9, a ring 11, a snap 12. The valve cartridge 2' and the upper actuator 5' consist of the valve cartridge assembly of the present invention.

In particular, the main difference between the ball valve of the present embodiment and the above embodiment is that: the ball valve 200 of the present embodiment does not includes the lower actuator and the transmission member connecting the upper actuator and the lower actuator, and the bottom structure of the valve cartridge 2' as well as the structure of the positioning member 6' are changed accordingly. The remaining members are basically as same as the corresponding members of the above embodiment, which is not described in detail herein.

FIG. 14 shows the perspective structure of the valve cartridge 2' according to the present embodiment. As shown in FIG. 14, the upper structure of the valve cartridge 2' is as same as that of the above embodiment, which is not described in detail herein. The bottom of the valve cartridge 2' is provided with a recess engaging with the positioning member 6'. The recess is not provided with radially inward convex, pits, long positioning hole and the valve cartridge bottom protrusion. The recess is only used to engage with the positioning member so that the valve cartridge can axially move under the support from the positioning member.

Figure 15:
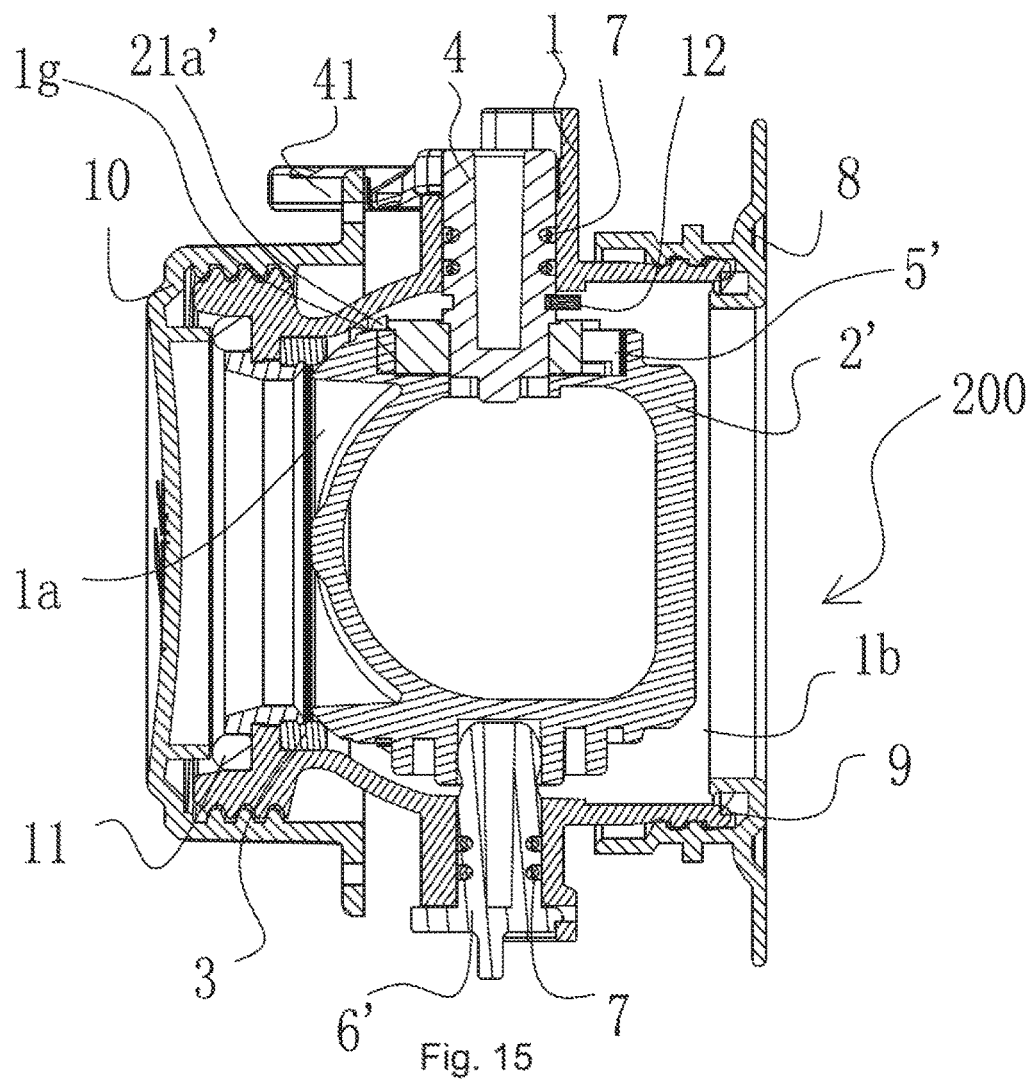
FIG. 15 shows a sectional view of the ball valve after being assembled.

FIG. 15 shows a sectional view of the ball valve 200 after being assembled. Upon assembling, the opening process and closing process of the ball valve 200 is similar to that of the above embodiment, which will not be described in detail herein. The valve cartridge top protrusion 21*a*' is engaged with the valve top wall protrusion 1*g* during the process that the valve is opened, so that the valve cartridge can not radially rotate before departing from pressing the valve body, i.e. before reaching a pre-opening state, and begin to radially rotate when reaching the pre-opening state.

The relative position of the valve top wall protrusion 1*g* and the valve cartridge top protrusion 21*a*' is arranged so that the valve cartridge top protrusion 21*a*' is engaged with the valve top wall protrusion 1*g* before the valve cartridge departs from contacting with the valve seat, and disengaged with the valve top wall protrusion 1*g* after the valve cartridge departs from pressing the valve seat.

Figure 16:
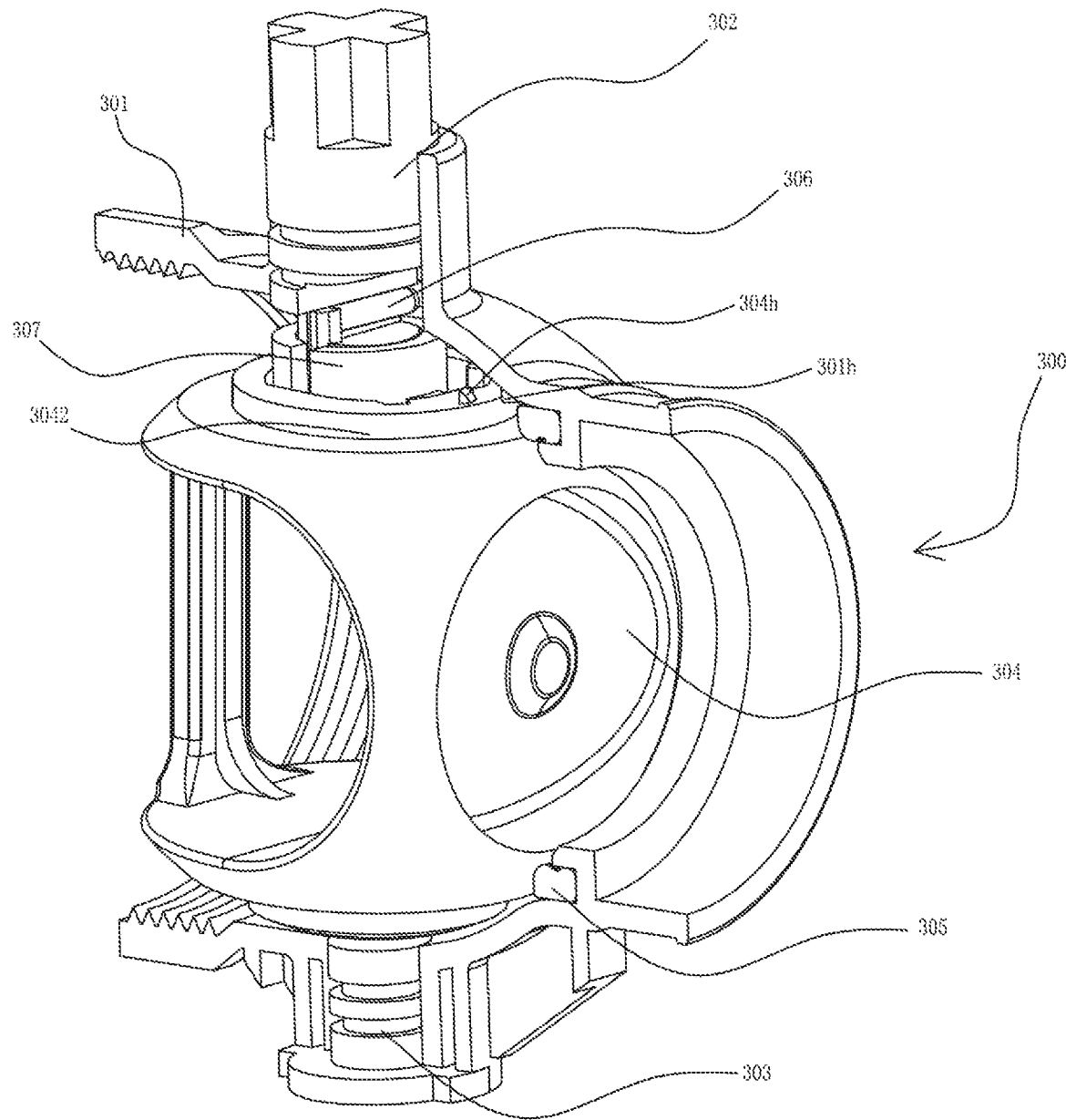
FIG. 16 is a schematic perspective view of the valve structure which is partially cut according to another embodiment of the present invention.
Figure 17:
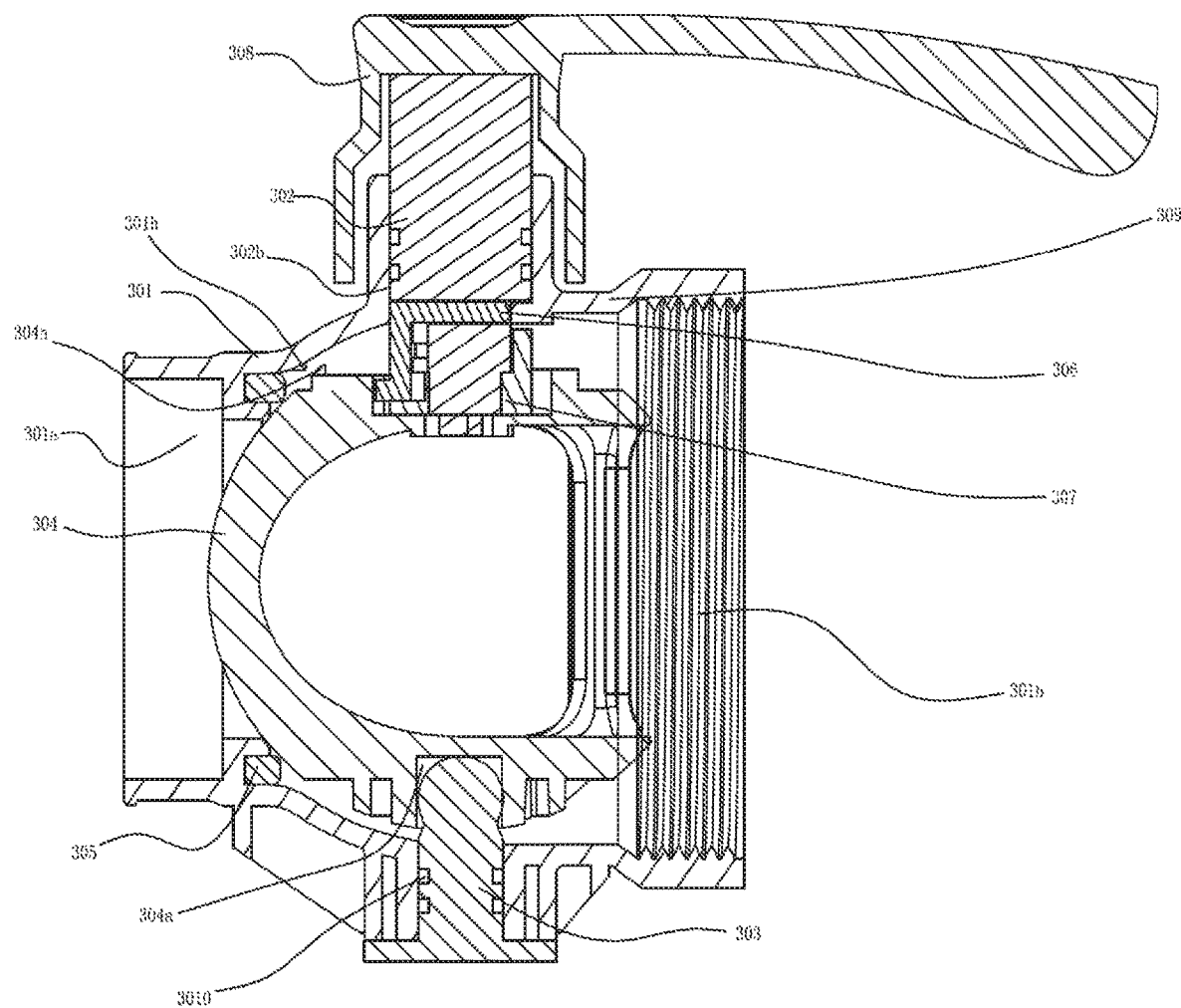
FIG. 17 is a side sectional view of the valve in FIG. 16 of the present invention.
Figure 18:
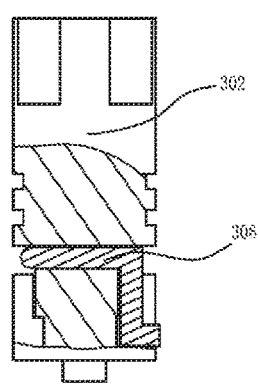
FIG. 18 is schematic view of the valve stem and the sliding rod being assembled together according to the embodiment of the present invention.

FIGS. 16-30 show the valve 300 according to a third embodiment of the present invention. As shown in FIGS. 17, 18 and 20, the valve of a preferable embodiment according to the present invention includes a valve body 301, a valve stem 302, a positioning member 303, a valve cartridge 304, a valve seat 305, a sliding rod 306 and a transmission member 307. The valve body 301, the valve stem 302, the positioning member 303, the valve cartridge 304 and the transmission member 307 have a same vertical axis. The valve cartridge assembly of the present invention consists of the valve cartridge 304, the valve stem 302, sliding rod 306 and a transmission member 307.

As shown in FIGS. 17 and 18, the valve body 301 is a shell having an upper end, a lower end, a left side and a right side. An inner space is formed in the shell for accommodating the valve cartridge 304, the transmission member 307, the valve stem 302 and one portion of the sliding rod 306. An inlet 301*a* and an outlet 301*b* are formed on the left side and right side (defined according to the position shown in FIG. 17, only for convenience of description) of the shell along a horizontal axis (not shown) respectively for connecting the container and the outside. The valve seat 305 is provided on the inner side of the inlet 301*a* along the horizontal axis. A valve stem hole 302*b* and the lower through hole 3010 are provided on the upper end and lower end of the valve body 301 respectively along a vertical axis (not shown) perpendicular to the horizontal axis.

Figure 29:
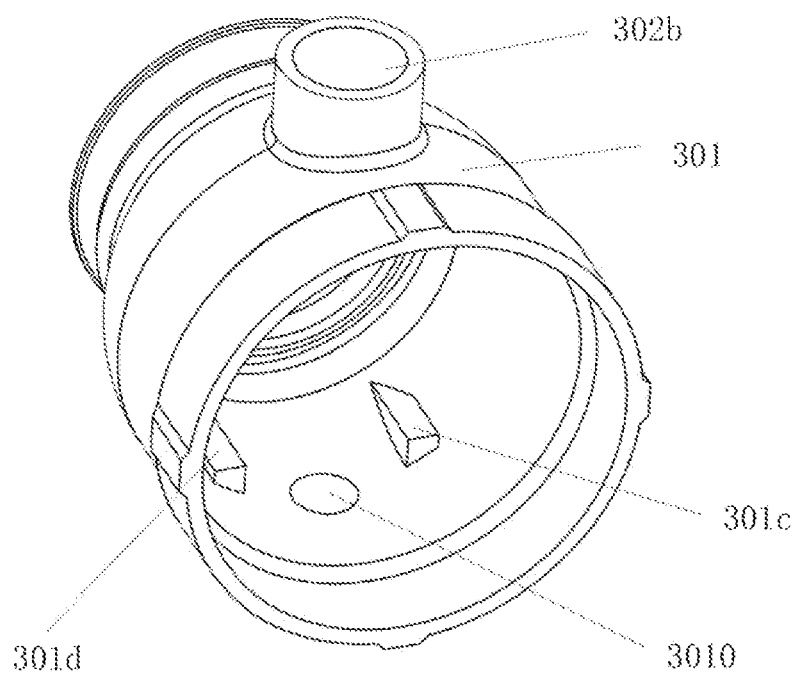
FIG. 29 is a schematic perspective view of the valve body of the present invention, showing the position limiting structure on the bottom of the valve body.

As shown in FIG. 29, position limiting members 301d, 301c are radially provided in the bottom of the valve body 301 and on both sides of the lower through-hole 3010. The position limiting members 301d, 301c are engaged with position limiting protrusions of the valve cartridge 304 respectively (which will be described in more detail hereinafter), so that the valve cartridge 304 can only rotate within the angle range of 90 degree in the valve body 301. As shown in FIGS. 17 and 20, a radially inward convex 309 is provided on the inner wall of the valve stem hole 302b located on the top end wall of the valve body.

A position limiting protrusion 301h is provided on the top wall of the inner space of the valve body. The relative position of the position limiting protrusion 301h and the corresponding protrusion 304h provided on the valve cartridge is arranged so as to restrict movement of the valve cartridge to a certain extent and make it move in a particular movement sequence, and not prevent the valve from closing when the valve is closed, which will be described in more detail hereinafter.

Figure 23:
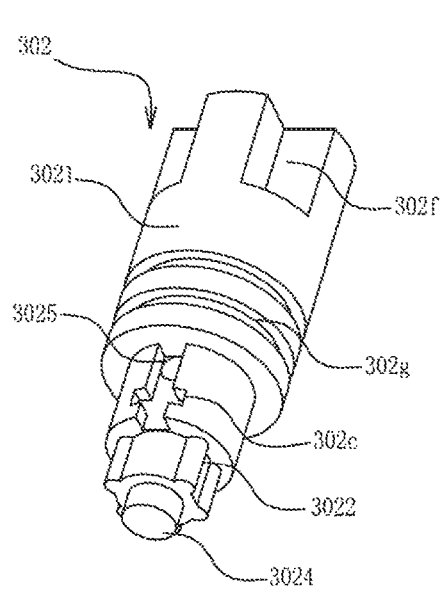
FIG. 23 is a schematic perspective structure view of the valve stem in FIG. 16 according to the present invention.
Figure 24:
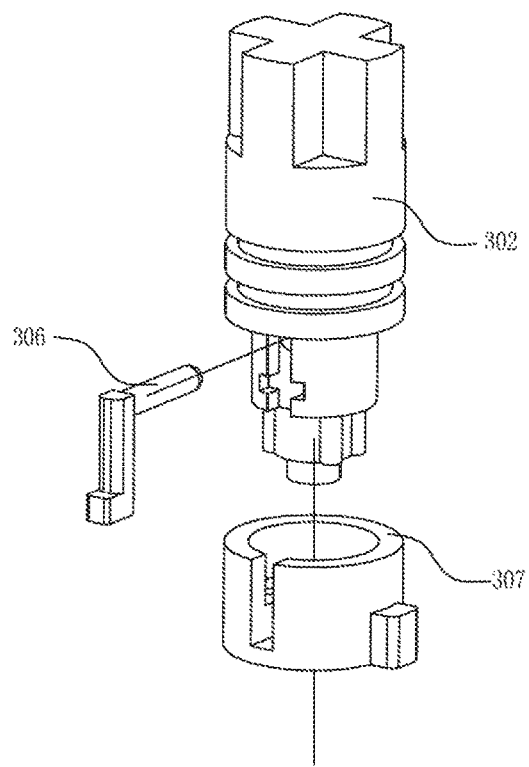
FIG. 24 is an exploded perspective view of an assembly components including the valve stem, the sliding rod and the transmission member in FIG. 16 according to the present invention.

As shown in FIG. 17, the valve stem 302 is rotatably accommodated in the valve stem hole 302b. The positioning member 303 is accommodated in the lower through-hole 3010 of the valve body 301 and the lower end of it is sealed and secured from the wall of the lower through-hole 3010 through the seal ring, wherein the upper portion of the positioning member 303 passes through the lower through-hole 3010 and connects to the supporting hole at the bottom of the valve cartridge (which will be described in more detail hereinafter). The particular structure of the valve stem 302 is shown in FIGS. 18, 23 and 24. A cross-shape head 302f is formed on the upper portion of the valve stem 302. A handle 308 is mounted on the cross-shape head 302f (as shown in FIG. 17). The valve stem 302 can be driven rotating about the vertical axis by wrenching the handle 308. At least one annular groove 302g (two annular grooves are shown in the figure) is formed in the circumference of central portion of the valve stem 302. A seal ring (not shown) is placed in the annular groove 302g to achieve fluid seal with the wall of the valve stem hole 302b. As shown in FIG. 23, a through-hole 3025 is radially provided in the central portion of the valve stem 302 and under the annular groove 302g. A cross-shape groove 302c, which is located under one opening of the through-hole 3025, is axially provided in the outer wall of the valve stem 302 and includes a horizontal groove and an axial groove perpendicular to the horizontal groove and the groove extends to the lower end surface of the central portion of the valve stem. A transmission rod 3022 is formed on the bottom end of the valve stem 302. In the present embodiment, the transmission rod 3022 is a spline rod 3022 with a supporting portion 3024 coaxially extending from the bottom surface of the spline rod 3022. The supporting portion 3024 is a cylindrical member. In the present embodiment, the supporting portion 3024 is a cylinder with a circular cross-section. However, the person skilled in the art should understand that the supporting portion 3024 may has triangular, square cross-section and so on.

Figure 20:
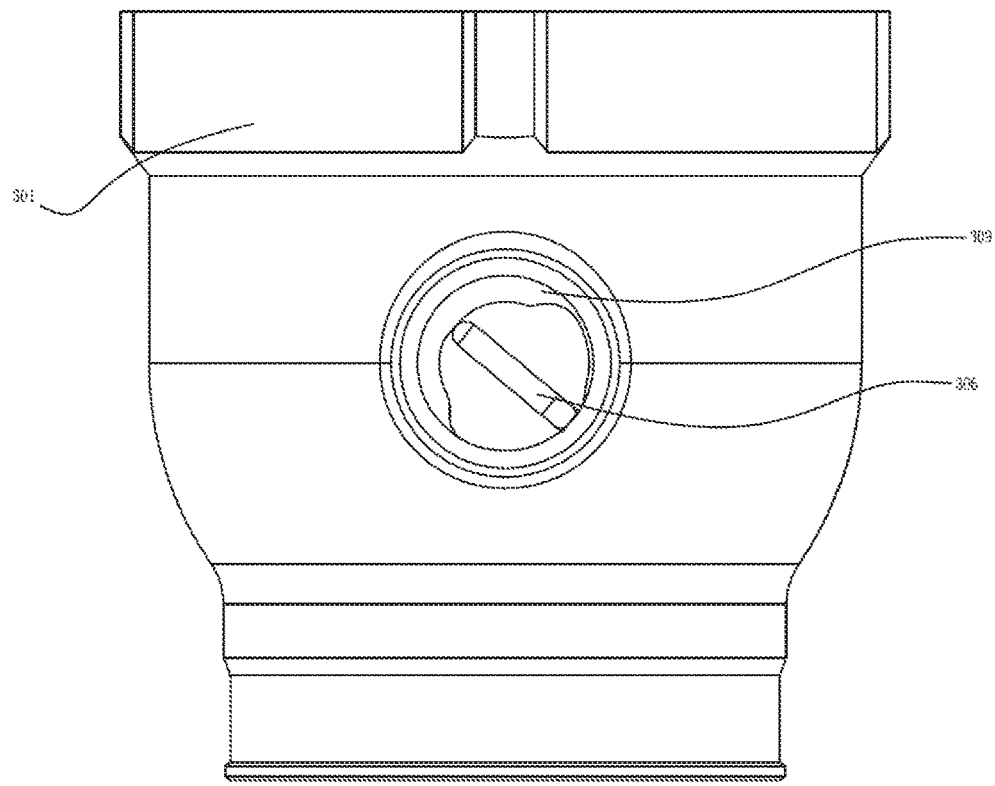
FIG. 20 is a schematic top view showing the relative position of the sliding rod and the valve body in FIG. 16.
Figures 21, 22:
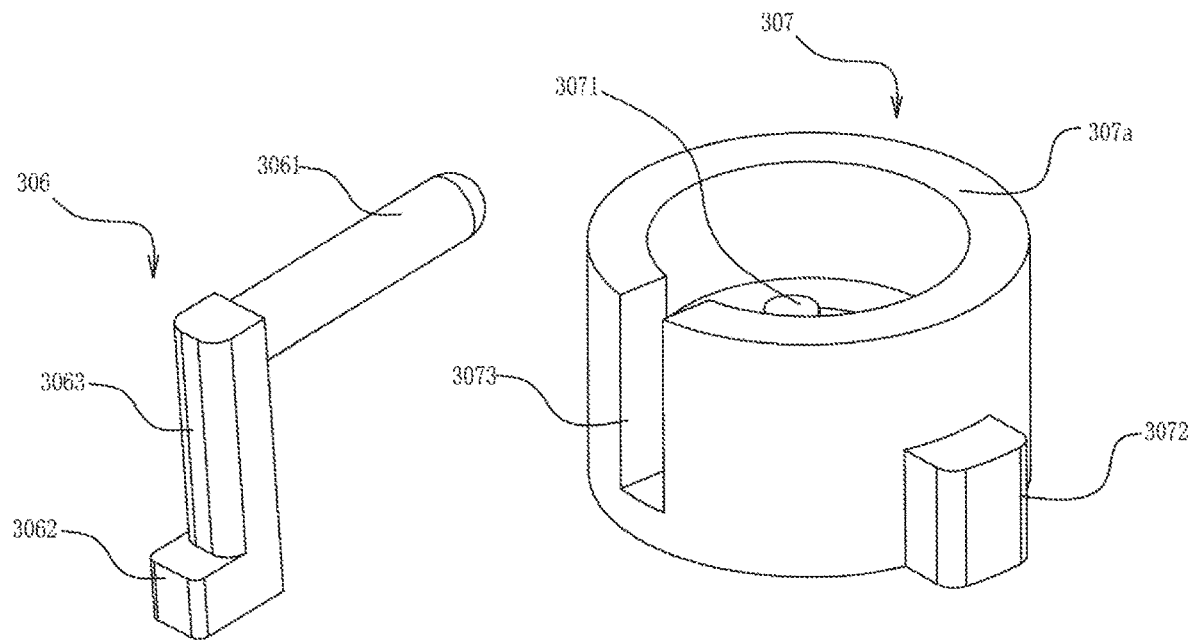
FIG. 21 is a schematic perspective structure view of the sliding rod in FIG. 16 according to the present invention.
FIG. 22 is a schematic perspective structure view of the transmission member in FIG. 16 according to the present invention.

FIGS. 21 and 24 show the particular structure of the sliding rod 306. As shown in the Figures, the sliding rod 306 includes a rod body 3063, a sliding pole 3061 and protrusion 3062 reversely extending from both ends of the rod body 3063 and perpendicular to the rod body 3063. As shown in FIGS. 17 and 20, the sliding pole 3061 is arranged in the through-hole 3025 and contacts with the radially inward convex 309 of the valve body at the end. The sliding pole 3061 has a pillar structure. In present embodiment, the sliding pole 3061 has a circular cross-section. However, the sliding pole 3061 may have other shape of cross-sections as desired, such as round, oval, hexagonal, and any other suitable shapes etc. The protrusion 3062 is an elongated body. In the present embodiment, the elongated body has a rectangle cross-section and the surface of it engaged with the recess of the valve cartridge 304 has a circular shape (which will be described hereinafter). However, the person skilled in the art will appreciate that protrusion 3062 can be an elongated body with a circular cross-section, a polygon cross-section and so on, as desired. The sliding pole 3061 having a pillar structure passes through the through-hole 3025 of the valve stem 302 when assembling the sliding rod 306 onto the valve stem 302, wherein the rod body 3063 is embeded into the axial groove of the cross-shape groove 302c provided on the valve stem. Upon assembling, the assembly is shown in FIG. 18. The sliding pole 3061 of the sliding rod 306 can radially move outward or inward in the through-hole 3025.

FIG. 22 shows the particular structure of the transmission member 307. As shown in FIG. 22, the transmission member 307 a cylindrical body with a bottom portion and an opening opposite to the bottom portion. A inner hole 307a is axially formed inside the transmission member 307 and between the opening and the bottom portion for accommodating the valve stem 302. A transmission hole 3071 is provided on the bottom portion. In the present embodiment, the transmission hole 3071 is a spline hole. A radially outward convex 3072 radially extending toward the outside is provided on the outer peripheral wall of the bottom portion. As shown in Figs., in the present embodiment, the radially outward convex has a substantially rectangular shape. Its two axially outer corners are rounded or beveled. It should be noted that the radially outward convex may be other protrusions with irregular shapes. The radially outward convex 3072 can interact with the radially inward convex provided on the inner wall of the recess of the valve stem 304 (which will be described hereinafter). The transmission hole 3071 is engaged with the transmission rod 3022 of the valve stem 302. In the present embodiment, the spline hole 3071 is engaged with the spline rod 3022, so that the transmission member 307 is driven to rotate by the valve stem 302. An axially elongated cutout 3073 is axially formed downward in the outer wall of the cylindrical body of the transmission member 307 from the opening of the inner hole 307a. The rod body 3063 of the sliding rod 306 and the protrusion 3062 is just accommodated in the cutout 3073 when the valve stem 302 and the sliding rod 306 are inserted into the inner hole 307a (as shown in FIG. 18).

Figure 25:
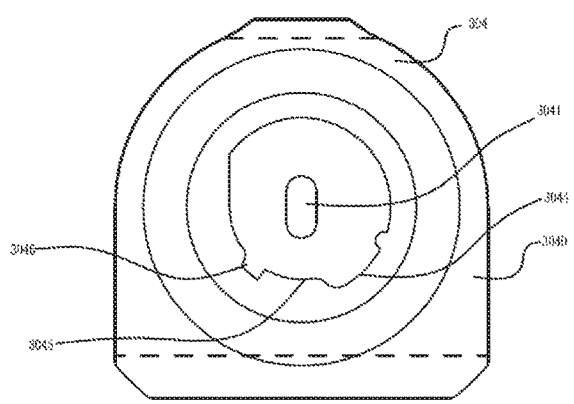
FIG. 25 shows a top view of the valve cartridge structure in FIG. 16 according to the present invention, which rotates 90 degree relative to FIG. 19.

FIG. 25 shows a particular structure arrangement of the valve cartridge 304 of the present invention. In the present embodiment, the valve cartridge 304 is in a form of a substantially hollow spherical shell and has a vertical axis (not shown), along which a recess 3040 is formed in the top wall of the spherical shell and a supporting hole 304a is formed in the bottom of the lower wall. As shown in FIG. 16, in order to make the recess have the desired depth, a strengthening lug boss 3042 is formed on the top outer periphery of the opening of the recess. However, the strengthening lug boss 3042 may not be formed. A radially inward convex is formed in the inner periphery wall of the recess 3040, which is provided with at least two pits 3044, 3046 and protrusions 3045 spacing the two pits 3044, 3046. The pit 3044 of the two pits and the protrusion 3045 can be detachably connected to the radially outward convex 3072 (i.e. a protrusion protruding toward outside) of the transmission member 307. The other pit 3046 of the two pits is detachably connected to the protrusion 3062 of the sliding rod 306. A long positioning hole 3041 is formed in the center of the bottom wall of the recess toward the protrusion 3045. The long positioning hole 3041 is an elongated hole having two parallel sides and two cambered ends for engaging with the supporting portion 3024.

Figure 30:
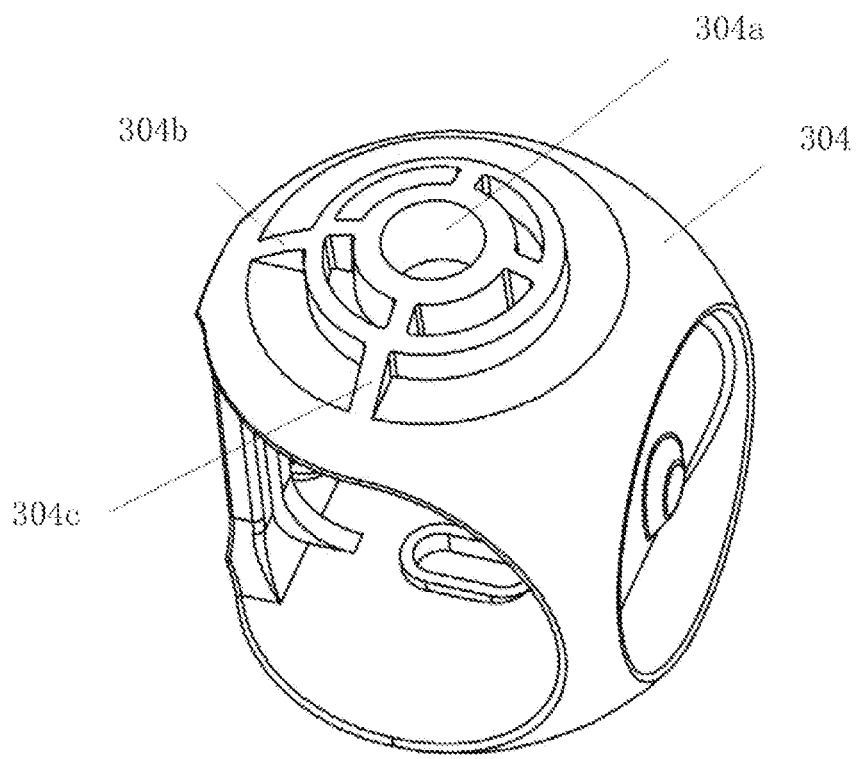
FIG. 30 is a schematic perspective view of the valve cartridge of the present invention, wherein the valve cartridge is bottom-up for showing the position limiting structure on the bottom of the valve cartridge.

As shown in FIG. 30, positioning limiting protrusions 304b, 304c are radially provided on the bottom of the valve cartridge 304 and outside of the supporting hole 304a for engaging with the position limiting member 301b, 301c of the valve body 301. The positioning limiting protrusions 304b, 304c form a 90 degree angle between them. The positioning limiting protrusion 304c is engaged with the positioning limiting member 301d when the valve cartridge is rotated to the closing position during the process that the valve is closed, so as to prevent the valve cartridge from rotating beyond 90 degree. The positioning limiting protrusion 304b is engaged with the positioning limiting member 301c when the valve cartridge is rotated to the full open position during the process that the valve is opened, so as to prevent the valve cartridge from rotating beyond 90 degree.

Figure 27:
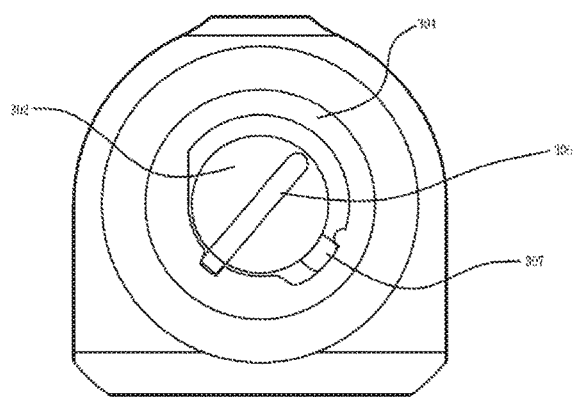
FIG. 27 is a schematic top view of the valve in FIG. 16 according to the present invention when the valve is pre-closed.

The supporting portion 3024 of the valve stem is accommodated in the positioning hole 3041 during the valve is in the pre-closing state as shown in FIG. 27, so that the valve cartridge 304 only has freedom of movement in the direction of the latus rectum of the valve body 301.

A position limiting structures, provided on the top of the valve cartridge, are engaged with the corresponding position limiting structures of the valve body, so as to restrict movement of the valve to a certain extent and make it move in a particular movement sequence during the process that the valve is opened.

In particular, the corresponding position limiting structures of the valve cartridge are a valve cartridge top protrusion 304h provided on the top of the valve cartridge.

The valve cartridge top protrusion 304h is engaged with the valve top wall protrusion 301h during the process that the valve is opened, so that the valve cartridge can not radially rotates before being departed from pressing the valve body, i.e. before reaching a pre-opening state, and begin to radially rotate when disengaged from the valve seat.

The relative position of the valve top wall protrusion 301h and the valve cartridge top protrusion 304h is arranged so that the valve cartridge top protrusion 304h is engaged with the valve top wall protrusion 301h before the valve cartridge departs from contacting with the valve seat, and disengaged with the valve top wall protrusion 301h after the valve cartridge departs from pressing the valve seat.

Figure 19:
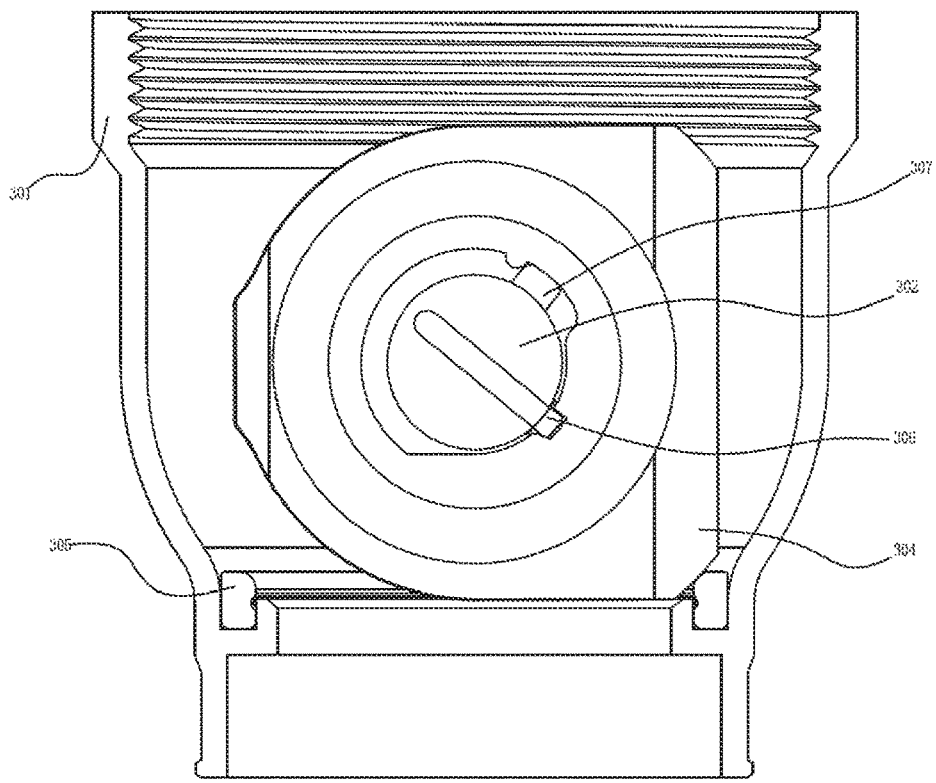
FIG. 19 is a schematic top view of the valve in FIG. 17 when counterclockwise rotating 90 degree after being horizontally cut at the recess of the valve cartridge, wherein the valve is opened.
Figure 26:
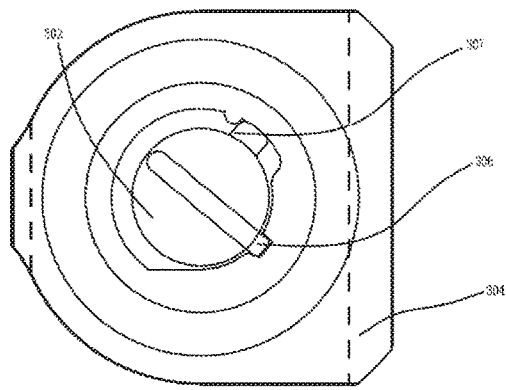
FIG. 26 is a schematic top view of the valve in FIG. 16 according to the present invention when the valve is fully opened.
Figure 28:
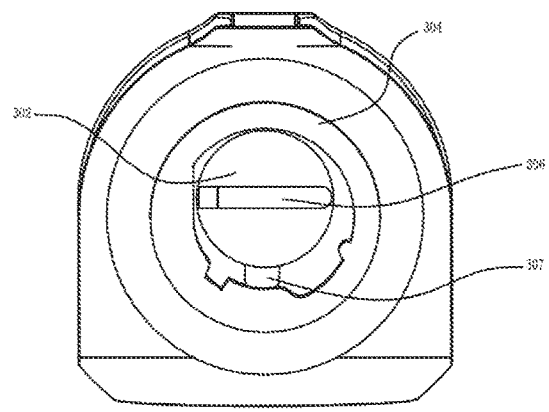
FIG. 28 is a schematic top view of the valve in FIG. 16 according to the present invention when the valve is fully closed.

FIGS. 19 and 26 show the relative positions of the valve cartridge 304, the valve stem 302, the sliding rod 306 and the transmission member 307 when the valve is in an opening state. When the valve stem 302 is driven rotating by handle, the valve cartridge 304 rotates along with the rotation of the valve stem 302, since the protrusion 3062 of the sliding rod 306 is located in pit 3046 provided on the inner wall of the recess 3040 of the valve cartridge 304. Since the valve cartridge 304 and the valve body 301 have positioning limiting protrusions 304b, 304 and position limiting members 301b, 301c at the bottom thereof respectively, when the valve is rotated to the closing state, that is the relative position shown in FIG. 27, the valve cartridge 304 can only rotate within the angle range of 90 degree in the valve body 301, therefore, the valve cartridge 304 no longer rotates along with rotation of the valve stem 302.

The valve stem 302 continues to rotate and the protrusion 3062 of the sliding rod 306 is driven to move by the radially inward convex 309 provided on the wall of the valve stem hole 302b of the valve body 301. When being disengaged from the pit 3046 provided on the side wall of the recess 3040 of the valve cartridge 304, the valve cartridge 304 can not rotates along with the rotation of the valve stem 302. The valve stem 302 drive the transmission member 307. The radially outward convex of the transmission member 307 and the convex spherical valve cartridge of the valve cartridge 304 generally can rotate around certain rotating point and press the seal ring.

In the valve of the present invention, as the valve cartridge does not contact with the valve seat or valve body and is in a vacant state during the process that the valve is pre-closed or opened, the frictional force between them is reduced and the torque is reduced as well (the spherical valve cartridge is radially pressed only at the moment when the valve is closed), so that the torque is very small during the process that the valve stem rotates, to achieve the effect that the valve is opened and closed in low torque.

Furthermore, when the valve needs to be opened, the valve stem is reversely rotated and the rotation of the valve stem drives the valve cartridge to move. The positioning limiting structures (the positioning limiting protrusions) provided on the valve cartridge and on the valve body make the valve cartridge axially rotate only when the valve cartridge is changed from the seal state to the pre-opening state, that is, the valve cartridge is disengaged with the valve seat, otherwise, the valve will not be opened even if there is no frictional force between the valve body and the valve seat. In other words, there will be a clear switching relationship of sealing for the valve cartridge of the valve, due to the positioning limiting structures provided on the valve cartridge and on the valve body, and whatever convenient the valve was used in, there is no problem of the friction between the cartridge and the seal ring, so that the opening and closing of the valve is more safe.

It should be noted that the ball valve in the above embodiment is used as an example, the structure of the present invention can also be applied in other valve, such as butterfly valve. Each member of the present invention can also employ other configurations without departing from the spirit of the invention. For example, the handle and the valve stem may be singe members, or may be an integral member. The connection of the drive member and the valve stem can employ a spline coupling, a screw connection, an anchor coupling, welding or the like means known to the person skilled in the art.

Preferred embodiments of the present invention has been described in detail above, while it is to be understood that, after reading the above teachings of the present invention, those skilled in the art may make various modifications or amendments to the present invention. These equivalent forms still fall into the scope limited by appended claims of the present application.

What is claimed is:
1. A valve, comprising:
a valve body, a valve stem, a valve cartridge, and a valve seat, the valve body having an inlet and an outlet, an inner space being formed between the inlet and the outlet for accommodating the valve cartridge, the valve seat being arranged inside the outlet, the valve cartridge being rotatable around an axis to open or close the valve,
a transmission device to transmit movement of the valve stem to the valve cartridge and a position limiting device to limit a movement sequence of the valve cartridge;

the valve cartridge includes a recess, at least one portion of the transmission device provided in the recess of the valve cartridge to form a first transmission relationship and a second transmission relationship with the recess of the valve cartridge;

the first transmission relationship is a radial rotation of the valve cartridge driven by the transmission device, the first transmission relationship is changed to the second transmission relationship between the transmission device and the valve cartridge when the first transmission relationship is finished, and the second transmission relationship is a pressing movement of the valve cartridge relative to the valve seat driven by the transmission device, and the pressing movement renders the valve cartridge at least a radial component of movement;

wherein the position limiting device limits movement of the valve cartridge during a process in which the valve is opened, such that the transmission device drives the valve cartridge to disengage from the valve seat before the valve cartridge is axially rotated and does not prevent the valve from closing during a process in which the valve is closed, the position limiting device comprises a position limiting structure on an inner wall of the valve body and another position limiting structure on the valve cartridge to cooperate with the position limiting structure on the inner wall of the valve body, the position limiting device is configured to prevent the valve cartridge from rotating toward an open direction via cooperation of the position limiting structure on the inner wall of the valve body and the position limiting structure on the valve cartridge, and the position limiting device is configured to release the valve cartridge, thereby allowing the valve cartridge to rotate toward an open direction via disengagement of the position limiting structure on the inner wall of the valve body and the position limiting structure on the valve cartridge.

2. The valve of claim 1, wherein the position limiting device consists of a protrusion provided on any one of the inner wall of the valve body and the valve cartridge and a protrusion or pit provided on the other of the inner wall of the valve body and the valve cartridge, the protrusion provided on any one of the inner wall of the valve body and the valve cartridge and the protrusion or pit provided on the other of the inner wall of the valve body and the valve cartridge have a mutually cooperating geometry shape and position relationship, and the geometry shape and position relationship are provided such that the protrusion provided on any one of the inner wall of the valve body and the valve cartridge and the protrusion or pit provided on the other of the inner wall of the valve body and the valve cartridge cooperate only after the first transmission relationship is changed to the second transmission relationship.

3. The valve of claim 1, wherein the position limiting device consists of a protrusion provided on any one of the inner wall of the valve body and the valve cartridge as well as a protrusion or pit provided on the other of the inner wall of the valve body and the valve cartridge, and the protrusion provided on any one of the inner wall of the valve body and the valve cartridge as well as the protrusion or pit provided on the other of the inner wall of the valve body and the valve cartridge have a mutually cooperating geometry shape and position relationship, and the geometry shape and position relationship are provided such that the protrusion provided on any one of the inner wall of the valve body and the valve cartridge as well as the protrusion or pit provided on the other of the inner wall of the valve body and the valve cartridge do not cooperate when the valve is in the first transmission relationship so as to not prevent the valve from opening or closing, and the protrusion provided on any one of the inner wall of the valve body and the valve cartridge as well as the protrusion or pit provided on the other of the inner wall of the valve body and the valve cartridge cooperate after the second transmission relationship is finished during the process that the valve is closed.

4. The valve of claim 1, wherein the position limiting device consists of a valve body protrusion provided on a top wall of the inner wall of the valve body and a valve cartridge protrusion provided on the top of the valve cartridge, and a geometry shape and position relationship between the valve body protrusion provided on the top wall of the inner wall of the valve body and the valve cartridge protrusion provided on the top of the valve cartridge is provided such that the valve body protrusion and the valve cartridge protrusion do not cooperate with each other when the valve is in the first transmission relationship during the process that the valve is closed, and the valve body protrusion and the valve cartridge protrusion cooperate with each other when the valve is in the second transmission relationship during the process that the valve is closed so that the second transmission relationship for the valve is not changed to the first transmission relationship before the second transmission relationship is finished.

5. The valve of claim 1, wherein the transmission device is a transmission member in one piece, at least one portion of the transmission member is provided in the recess of the valve cartridge, a radial inward convex is formed in the recess, a radially outward convex is formed on the transmission member, the transmission member is further provided with resilient ribs, the resilient ribs and an inner wall of the recess have a detachable connection relationship, and the resilient ribs are connected to the inner wall of the recess so that the transmission member and the valve cartridge having the first transmission relationship, the radially inward convex being cooperated with the radially outward convex so that the transmission member and the valve cartridge have the second transmission relationship, the resilient ribs being disconnected to the inner wall of the recess such that the transmission member can rotate in the valve cartridge and be switchable in the first transmission relationship or the second transmission relationship with the cartridge; and the position limiting device consists of a valve body protrusion provided on the valve body and a valve cartridge protrusion provided on the valve cartridge, and the valve body protrusion and the valve cartridge protrusion are arranged so as to not prevent the valve cartridge from moving during the process that the valve is closed and prevent the valve cartridge from rotating relative to the valve seat before the valve cartridge is disengaged from the valve seat during the process that the valve is opened.

6. The valve of claim 5, wherein the radially inward convex is successively provided with a position limiting protrusion, a starting portion, an intermediate portion and a termination portion, wherein the position limiting protrusion is used to limit a position of the radially outward convex so that the radially outward convex is not disengaged from the radially inward convex during rotating;

the starting portion is sloped, and the valve cartridge radially moves and presses against the valve seat when the radially outward convex moves along the starting portion;

the intermediate portion is a flat plane used to have the radially outward convex stay on the intermediate portion; and the termination portion is a protrusion at an end of the radially inward convex for stopping the radially outward convex, so as to prevent the radially outward convex from moving beyond the radially inward convex during rotating.

7. The valve of claim 1, wherein both ends of the valve cartridge are provided with a plurality of recesses, a radially inward convex is formed in the plurality of recesses; the transmission device includes two actuators, any one of the two actuators is provided with a radially outward convex and resilient ribs; at least one portion of the two actuators is provided in the recesses on both ends of the valve cartridge respectively; the resilient ribs and an inner wall of the recess has a detachable connection relationship; the first transmission relationship is a rotation of the valve cartridge around the axis driven by rotation of the actuators; the second transmission relationship is a radial movement of the both ends of the valve cartridge pressing against the valve synchronously driven by rotation of the actuators; and rotation of the actuators under resilient action of the resilient ribs drives the both ends of the valve cartridge move, thereby synchronously disengaging from the valve and then the actuators drives the valve cartridge to rotate around the axis; wherein the position limiting device consists of a valve body protrusion provided on a top wall and a bottom wall inside of the valve body and a valve cartridge protrusion provided on both ends of the valve cartridge, and the valve body protrusion and the valve cartridge protrusion are arranged so as to not prevent the valve cartridge from moving during the process that the valve is closed and prevent the valve cartridge from rotating relative to the valve seat before the valve cartridge is disengaged from the valve seat during the process that the valve is opened.

8. The valve of claim 7, wherein the radially inward convex is successively provided with a position limiting protrusion, a starting portion, an intermediate portion and a termination portion, wherein the position limiting protrusion is used to limit a position of the radially outward convex so that the radially outward convex is not disengaged from the radially inward convex during rotating;

the starting portion is slop, and the valve cartridge radially moves and presses against the valve seat when the radially outward convex moves along the starting portion;

the intermediate portion is a flat plane used to have the radially outward convex stay on the intermediate portion; and the termination portion is a protrusion at an end of the radially inward convex for stopping the radially outward convex, so as to prevent the radially outward convex from moving beyond the radially inward convex during rotating.

9. The valve of claim 1, wherein the transmission device includes a transmission member and a sliding rod;

the transmission member is connected to an end of the valve stem and can rotate along with the rotation of the valve stem; at least one portion of the transmission member is provided in the recess of the valve cartridge;

a radially inward convex is provided in the inner periphery wall of the recess; a radially outward convex is provided on the transmission member; the valve stem is provided with a stem inner chamber on an end of the valve stem for accommodating the sliding rod; and the valve body is provided with an inward convex surrounding the valve stem;

the inward convex of the valve body presses against the sliding rod and drives the sliding rod to radially move in the stem inner chamber and the valve cartridge is synchronously driven to rotate by the sliding rod to form the first transmission relationship when the valve stem is rotating; the radially outward convex of the transmission member at the end of the valve stem cooperates with the radially inward convex of the recess of the valve cartridge so that the rotation of the transmission member around the same axis is changed to a radial movement of the valve seat by the valve cartridge pressing against the valve body thereby forming the second transmission relationship, when the sliding rod in the valve stem moves along a radial movement until the radially inward convex drives the sliding rod to be disengaged from the valve cartridge;

wherein the position limiting device consists of a valve body protrusion provided on the valve body and a valve cartridge protrusion provided on the valve cartridge, the valve body protrusion and the valve cartridge protrusion are arranged so as to not prevent the valve cartridge from moving during the process that the valve is closed and prevent the valve cartridge from rotating relative to the valve seat before the valve cartridge is disengaged from the valve seat during the process that the valve is opened.

10. The valve of claim 9, wherein the sliding rod includes a rod body, a sliding pole and a protrusion reversely extending from both ends of the rod body and perpendicular to the rod body, the sliding pole is provided in the stem inner chamber, and the protrusion of the sliding rod and the radially inward convex provided in the inner periphery wall of the recess of the valve cartridge have a detachable connecting relationship.

11. The valve of claim 10, wherein the radially inward convex provided in the inner periphery wall of the recess of the valve cartridge is provided with at least two pits and a protrusion which spaces the two pits, one of the at least two pits is detachably connected to the radially outward convex of the transmission member; and the other of the at least two pits is detachably connected to the protrusion of the sliding rod.

12. The valve of claim 1, wherein the second transmission relationship includes an engaged state and a disengaged state; when the position limiting device is in the engaged state, the valve cartridge is locked in an open position or a closed position via engagement of a first position limiting mechanism formed on the valve cartridge and a second position limiting mechanism formed on the valve body, and when the position limiting device is in the disengaged state, the valve cartridge is unlocked and movable between an open position and a closed position upon disengagement of the first position limiting mechanism from the second position limiting mechanism.

* * * * *